United States Patent
Lei et al.

(10) Patent No.: US 12,513,142 B2
(45) Date of Patent: Dec. 30, 2025

(54) SECONDARY AUTHENTICATION METHOD AND APPARATUS

(71) Applicant: HUAWEI TECHNOLOGIES CO., LTD., Guangdong (CN)

(72) Inventors: Zhongding Lei, Singapore (SG); Haiguang Wang, Singapore (SG); Xin Kang, Singapore (SG)

(73) Assignee: Huawei Technologies Co., LTD., Shenzhen (CN)

( * ) Notice: Subject to any disclaimer, the term of this patent is extended or adjusted under 35 U.S.C. 154(b) by 468 days.

(21) Appl. No.: 17/532,757

(22) Filed: Nov. 22, 2021

(65) Prior Publication Data

US 2022/0086145 A1    Mar. 17, 2022

Related U.S. Application Data

(63) Continuation of application No. PCT/CN2020/088907, filed on May 7, 2020.

(30) Foreign Application Priority Data

Jun. 17, 2019    (CN) .......................... 201910522598.3

(51) Int. Cl.
*H04L 29/06* (2006.01)
*H04L 9/40* (2022.01)
*H04W 12/06* (2021.01)

(52) U.S. Cl.
CPC ...... *H04L 63/0869* (2013.01); *H04L 63/0876* (2013.01); *H04W 12/06* (2013.01)

(58) Field of Classification Search
CPC . H04L 63/0869; H04L 63/0876; H04W 12/06
See application file for complete search history.

(56) References Cited

U.S. PATENT DOCUMENTS

2003/0186680 A1 *  10/2003  Bhasin ............... H04W 12/068
                                                          455/414.1
2009/0183246 A1 *  7/2009   Kokologiannakis .... G06F 21/31
                                                          726/7
(Continued)

FOREIGN PATENT DOCUMENTS

CN         101626369 A       1/2010
CN         101754219 A       6/2010
(Continued)

OTHER PUBLICATIONS

3GPP TR 23.740 V16.0.0 (Dec. 2018), "3rd Generation Partnership Project; Technical Specification Group Services and System Aspects; Study on Enhancement of Network Slicing(Release 16)," Dec. 2018, 70 pages.

(Continued)

*Primary Examiner* — Vance M Little
(74) *Attorney, Agent, or Firm* — Fish & Richardson P.C.

(57) ABSTRACT

The present disclosure relates to secondary authentication methods and apparatus. In one example method, a core network function entity obtains an identity of a first terminal device, where the identity of the first terminal device is an identity in a first network. The core network function entity sends the identity of the first terminal device to an authentication device in a second network, where the identity of the first terminal device is used to determine an identity used by the second network to perform secondary authentication on a first user, and the identity of the first user is different from the identity of the first terminal device.

20 Claims, 15 Drawing Sheets

(56) References Cited

U.S. PATENT DOCUMENTS

| | | | | |
|---|---|---|---|---|
| 2009/0227226 | A1* | 9/2009 | Gupta | H04W 8/18 |
| | | | | 455/411 |
| 2010/0269153 | A1* | 10/2010 | Kato | H04L 9/321 |
| | | | | 726/3 |
| 2017/0118165 | A1* | 4/2017 | Kumar | G06F 16/9537 |
| 2018/0069846 | A1* | 3/2018 | Park | H04W 12/041 |
| 2018/0317157 | A1 | 11/2018 | Baek et al. | |
| 2019/0116521 | A1 | 4/2019 | Qiao et al. | |
| 2019/0174208 | A1* | 6/2019 | Speicher | G06F 1/163 |
| 2019/0174449 | A1 | 6/2019 | Shan et al. | |
| 2019/0260741 | A1* | 8/2019 | Ashok | H04L 63/083 |
| 2021/0076209 | A1* | 3/2021 | Suh | H04W 8/08 |

FOREIGN PATENT DOCUMENTS

| | | |
|---|---|---|
| CN | 102143136 A | 8/2011 |
| CN | 107809776 A | 3/2018 |
| CN | 108012267 A | 5/2018 |
| CN | 108200007 A | 6/2018 |
| CN | 108347729 A | 7/2018 |
| CN | 108833181 A | 11/2018 |
| CN | 108881252 A | 11/2018 |
| CN | 108901018 A | 11/2018 |
| CN | 109104726 A | 12/2018 |
| CN | 109150864 A | 1/2019 |
| CN | 109511115 A | 3/2019 |
| CN | 111818516 A | 10/2020 |

OTHER PUBLICATIONS

3GPP TR 33.813 V0.4.0 (May 2019), "3rd Generation Partnership Project; Technical Specification Group Services and System Aspects; Security Aspects; Study on Security Aspects of Enhanced Network Slicing(Release 16)," May 2019, 27 pages.

3GPP TS 33.501 V15.12.0 (Mar. 2021), "3rd Generation Partnership Project; Technical Specification Group Services and System Aspects; Security architecture and procedures for 5G system(Release 15)," Mar. 2021, 192 pages.

3GPP TS 23.502 V16.1.1 (Jun. 2019), "3rd Generation Partnership Project; Technical Specification Group Services and System Aspects; Procedures for the 5G System; Stage 2(Release 16)," Jun. 2019, 495 pages.

Aboba et al., "Extensible Authentication Protocol (EAP)," Network Working Group, Request for Comments: 3748, Jun. 2004, 67 pages.

Aboba et al., "The Network Access Identifier," Network Working Group, Request for Comments: 4282, Dec. 2005, 16 pages.

Huawei, Hisilicon, "A solution to KI#1 Authentication for access to specific Network Slices," 3GPP TSG SA WG3 (Security) Meeting #94, S3-190202, Kochi, India, Jan. 28-Feb. 1, 2019, 3 pages.

Office Action issued in Chinese Application No. 201910522598.3 on Aug. 11, 2021, 33 pages (with English translation).

PCT International Search Report and Written Opinion issued in International Application No. PCT/CN2020/088907 on Jul. 29, 2020, 13 pages (with English translation).

Simon et al., "The EAP-TLS Authentication Protocol," Network Working Groups, Request for Comments: 5216, Mar. 2008, 34 pages.

Jun-zhi et al., "Blockchain based PKI certificate system," Telecommunications Engineering Technology and Standardization, Nov. 2017, 5 pages (with English abstract).

Nokia et al., "Introduction of Network Slice-Specific Secondary authentication," 3GPP TSG-SA WG2 Meeting #131, S2-1901675, Tenerife, Spain, Feb. 25- Mar. 1, 2019, 17 pages.

Office Action issued in Chinese Application No. 201910522598.3 on Jun. 6, 2022, 7 pages (with English translation).

3GPP TR 33.899 V1.3.0 (Aug. 2017), "3rd Generation Partnership Project; Technical Specification Group Services and System Aspects; Study on the security aspects of the next generation system (Release 14)," Aug. 2017, 605 pages.

China Mobile, "Discussion on clarification of concept of slice authentication," 3GPP TSG SA WG3 (Security) Meeting #92, S3-182449, Dalian, China, Aug. 20-24, 2018, 5 pages.

Extended European Search Report issued in European Application No. 20827832.5 on May 30, 2022, 17 pages.

Huawei, "GPSI in 5G," 3GPP TSG CT4 Meeting #83, C4-182100, Montreal, Canada, Feb. 26-Mar. 2, 2018, 3 pages.

Samsung et al., "Clarification on ON authorization data," 3GPP TSG SA WG2 Meeting #131, S2-1902345, Santa Cruz, Tenerife, Spain, Feb. 25-Mar. 1, 2019, 3 pages.

Office Action issued in Chinese Application No. 201910522598.3 on Feb. 7, 2022, 39 pages (with English translation).

* cited by examiner

SECONDARY AUTHENTICATION METHOD AND APPARATUS

CROSS-REFERENCE TO RELATED APPLICATIONS

This application is a continuation of International Application No. PCT/CN2020/088907, filed on May 7, 2020, which claims priority to Chinese Patent Application No. 201910522598.3, filed on Jun. 17, 2019. The disclosures of the aforementioned applications are hereby incorporated by reference in their entireties.

TECHNICAL FIELD

This application relates to the communication field, and more specifically, to a secondary authentication method and an apparatus.

BACKGROUND

With rapid development of communication technologies, to meet diverse user requirements, a plurality of network slices may be deployed in an operator network to meet requirements of different applications and different vertical industries. Before being allowed to access a network or a network slice, a terminal device needs to perform mutual authentication with the network and/or the network slice and obtain authorization from the network and/or the network slice.

Currently, a 3rd generation partnership project (3GPP) network may support both a primary authentication mechanism and a secondary authentication mechanism, where the primary authentication mechanism is authentication between the terminal device and the operator network, and secondary authentication is authentication between the terminal device (or a user using the terminal device) and a third-party network.

In a secondary authentication process, the third-party network needs to obtain an identity for a user, but the identity of the user is usually requested by the operator network from the terminal device and then forwarded to the third-party network. In an entire process of sending the identity of the user, there is a risk that the identity of the user may be leaked.

SUMMARY

This application provides a secondary authentication method and an apparatus, to enhance security protection of an identity of a user in a secondary authentication process.

According to a first aspect, a secondary authentication method is provided. The method includes: a core network function entity obtains an identity of a first terminal device, where the identity of the first terminal device is an identity in a first network; and the core network function entity sends the identity of the first terminal device to an authentication device that is in a second network, where the identity of the first terminal device is used to determine an identity used by the second network to perform secondary authentication on a first user, and the identity of the first user is different from the identity of the first terminal device.

In the technical solution provided in this embodiment of this application, the core network function entity sends the identity of the first terminal device to the authentication device that is in the second network, where the identity of the first terminal device is used to determine the identity used by the second network to perform the secondary authentication on the first user. In this way, the core network function entity does not need to directly send, to the authentication device that is in the second network, the identity that is of the first user and that is used for the secondary authentication. This implicit sending manner enhances security protection of the identity of the first user, and can more efficiently and effectively protect the identity of the first user.

Further, in a conventional technology, the core network function entity sends a request to the first terminal device to obtain the identity of the first user, and the first terminal device sends the identity of the first user to the core network function entity in a request response. In the secondary authentication method provided in this embodiment of this application, the identity of the first terminal device is directly sent to the authentication device that is in the second network by using the core network function entity. In an out-of-band sending manner, messages used to request the identity of the first user from the first terminal device can be reduced, thereby improving efficiency of signaling and data interaction in a network, optimizing a secondary authentication procedure, optimizing network resources, and reducing a waste of network resources.

With reference to the first aspect, in a possible implementation, that the core network function entity sends the identity of the first terminal device to an authentication device that is in a second network includes: the core network function entity sends a secondary authentication request to the authentication device that is in the second network, where the secondary authentication request includes the identity of the first terminal device but does not include the identity of the first user In addition, the method further includes: the core network function entity receives a secondary authentication response message sent by the authentication device that is in the second network, where the secondary authentication response message is used to indicate the first terminal device and the second network to perform the secondary authentication on the first user.

With reference to the first aspect, in a possible implementation, the method further includes: the core network function entity sends a first message to the first terminal device, where the first message is used to request the identity of the first user; the core network function entity receives a second message sent by the first terminal device; and when the second message does not include the identity of the first user, the core network function entity performs the secondary authentication on the first user based on the identity of the first terminal device.

In this embodiment of this application, the core network function entity needs to request the identity of the first user from the first terminal device, but the first terminal device may not send the identity of the first user to the core network function entity, and the core network function entity may obtain the identity of the first terminal device. In this way, the core network function entity may perform the secondary authentication on the first user based on the identity of the first terminal device, Out-of-band implicit sending of the identity of the first user enhances security protection of the identity of the first user, and can more efficiently and effectively protect the identity of the first user. In addition, secondary authentication procedures of a new terminal device and a legacy terminal device may be compatible.

With reference to the first aspect, in a possible implementation, the method further includes: before performing the secondary authentication on the first user, the core network function entity obtains capability information of the first terminal device, where the capability information of the first terminal device is used to indicate that the core network function entity can perform the secondary authentication on the first user based on the identity of the first terminal device.

In this embodiment of this application, before the core network function entity performs the secondary authentication on the first terminal device, the first terminal device sends the capability information of the first terminal device to the core network function entity, and the core network function entity may determine, based on the capability information of the first terminal device, not to request the identity of the first user from the first terminal device. However, the core network function entity may obtain the identity of the first terminal device. In this way, the core network function entity may perform the secondary authentication on the first user based on the identity of the first terminal device. Out-of-band implicit sending of the identity of the first user enhances the security protection of the identity of the first user, and can more efficiently and effectively protect the identity of the first user. In addition, the secondary authentication procedures of the new terminal device and the legacy terminal device may be compatible.

Further, in the secondary authentication method provided in this embodiment of this application, the messages used to request the identity of the first user from the first terminal device can be reduced, thereby improving the efficiency of signaling and data interaction in the network, optimizing the secondary authentication procedure, optimizing the network resources, and reducing the waste of network resources.

With reference to the first aspect, in a possible implementation, the capability information of the first terminal device is carried in a registration request message that is in a process of primary authentication performed by the first terminal device and the first network.

The capability information of the first terminal device is carried outside the secondary authentication procedure, so that the network resources can be saved, and utilization of existing network resources can be improved.

With reference to the first aspect, in a possible implementation, the identity of the first terminal device corresponds to identities used by the second network to perform the secondary authentication on a plurality of users, the identities of the plurality of users include the identity of the first user, and the method further includes: the core network functions entity obtains a first indication, where the first indication is used to determine the identity of the first user in the identities of the plurality of users.

With reference to the first aspect, in a possible implementation, the method further includes: the core network function entity selects a first authentication method used for the secondary authentication, where the first authentication method is an authentication method supported by both the first terminal device and the authentication device that is in the second network.

In this embodiment of this application, the core network function entity selects the authentication method supported by both the first terminal device and the authentication device that is in the second network, sends the authentication method to the authentication device that is in the second network, and uses the authentication method as an authentication method negotiated by the first terminal device and the authentication device that is in the second network. This is equivalent to that the core network function entity and the first terminal device complete an authentication algorithm negotiation procedure, and there is no need for the first terminal device to negotiate with the authentication device that is in the second network, thereby shortening a message interaction procedure, reducing a latency, and saving the network resources.

With reference to the first aspect, in a possible implementation, that the core network function entity selects a first authentication method used for the secondary authentication includes: the core network function entity obtains a first authentication method set and a second authentication method set, where the first authentication method set includes an authentication method preferred by the first terminal device, and the second authentication method set includes an authentication method preferred by the authentication device that is in the second network; the core network function entity determines the first authentication method based on the first authentication method set and the second authentication method set, where the first authentication method is an authentication method preferred by both the first terminal device and the authentication device that is in the second network; and the core network function entity sends the first authentication method to the authentication device that is in the second network.

With reference to the first aspect, in a possible implementation, the second authentication method set is stored in the core network function entity, and/or the first authentication method set is stored in the first terminal device and/or the core network function entity.

With reference to the first aspect, in a possible implementation, the method further includes: the core network function entity obtains a first authentication method set and a second authentication method set, where the first authentication method set includes an authentication method preferred by the first terminal device; and the second authentication method set includes an authentication method preferred by the authentication device that is in the second network; and when there is no intersection set of the first authentication method set and the second authentication method set, the core network function entity sends the first authentication method set or a second indication to the authentication device that is in the second network, where the second indication is used to indicate the authentication device that is in the second network to negotiate an authentication method with the first terminal device.

When there is no intersection set of the first authentication method set and the second authentication method set, an authentication method list preferred by the first terminal device is provided to the authentication device that is in the second network, so that the authentication device in the second network can select an authentication method that can be supported by the authentication device from the authentication method list, thereby reducing a process and latency of negotiating and interacting with the first terminal device.

According to a second aspect, a secondary authentication method is provided. The method includes: receiving an identity of a first terminal device sent by a core network function entity, where the identity of the first terminal device is an identity in a first network; determining an identity of a first user based on the identity of the first terminal device and a mapping relationship between the identity of the first terminal device and the identity used by a second network to perform secondary authentication on the first user, where the identity of the first user is different from the identity of the first terminal device; and performing the secondary authentication on the first user based on the identity of the first user.

In this embodiment of this application, the authentication device in the second network may determine the identity of the first user by using the identity of the first terminal device and the mapping relationship between the identity of the first terminal device and the identity of the first user. Therefore, the core network function entity does not need to request the identity of the first user from the first terminal device. A manner of implicitly sending the identity of the first user can improve security protection of the identity of the first user, and reduce or eliminate a risk that an identity of a user is leaked.

With reference to the second aspect, in a possible implementation, the receiving an identity of a first terminal device sent by a core network function entity includes: receiving a secondary authentication request sent by the core network function entity, where the secondary authentication request includes the identity of the first terminal device but does not include the identity of the first user; and the performing the secondary authentication on the first user based on the identity of the first user includes: sending a secondary authentication response message to the core network function entity, where the secondary authentication response message is used to indicate the first terminal device and the second network to perform the secondary authentication on the first user.

With reference to the second aspect, in a possible implementation, the identity of the first terminal device corresponds to identities used by the second network to perform the secondary authentication on a plurality of users, the identities of the plurality of users include the identity of the first user, and the method further includes: receiving a first indication sent by the core network function entity, where the first indication is used to determine the identity of the first user in the identities of the plurality of users.

With reference to the second aspect, in a possible implementation, the method further includes: receiving a first authentication method sent by the core network function entity, where the first authentication method is an authentication method supported by both the first terminal device and an authentication device that is in the second network; and performing the secondary authentication on the first user according to the first authentication method.

With reference to the second aspect, in a possible implementation, the method further includes: receiving a first authentication method set sent by the core network function entity, where the first authentication method set includes an authentication method preferred by the first terminal device; selecting a second authentication method from the first authentication method set, where the second authentication method is an authentication method supported by an authentication device that is in the second network; and performing the secondary authentication on the first user according to the second authentication method.

With reference to the second aspect, in a possible implementation, the method further includes: receiving a second indication sent by the core network function entity, where the second indication is used to indicate an authentication device that is in the second network to negotiate an authentication method with the first terminal device.

According to a third aspect, a secondary authentication method is provided. The method includes: establishing a mapping relationship between an identity of a first terminal device and an identity used by a second network to perform secondary authentication on a first user, where the identity of the first terminal device is an identity in a first network; and sending the identity of the first terminal device to a core network function entity, or sending the identity of the first terminal device and a first indication to a core network function entity, where the first indication is used to determine the identity of the first user in identities used by the second network to perform the secondary authentication on a plurality of users.

With reference to the third aspect, in a possible implementation, the method further includes: before performing the secondary authentication on the first user, sending capability information of the first terminal device to the core network function entity, where the capability information of the first terminal device is used to indicate that the core network function entity can perform the secondary authentication on the first user based on the identity of the first terminal device.

With reference to the third aspect, in a possible implementation, the method further includes: sending a first authentication method set to the core network function entity, where the first authentication method set includes an authentication method preferred by the first terminal device.

According to a fourth aspect, a secondary authentication method is provided. The method includes: a core network function entity selects a first authentication method used for secondary authentication, where the first authentication method is an authentication method supported by both a first terminal device and an authentication device that is in a second network; and the core network function entity sends the first authentication method to the authentication device that is in the second network.

In this embodiment of this application, the core network function entity selects the authentication method supported by both the first terminal device and the authentication device that is in the second network, sends the authentication method to the authentication device that is in the second network, and uses the authentication method as an authentication method negotiated by the first terminal device and the authentication device that is in the second network. This is equivalent to that the core network function entity and the first terminal device complete an authentication algorithm negotiation procedure, and there is no need for the first terminal device to negotiate with the authentication device that is in the second network, thereby shortening a message interaction procedure, reducing a latency, and saving network resources.

With reference to the fourth aspect, in a possible implementation, that the core network function entity selects a first authentication method used for secondary authentication includes: the core network function entity obtains a first authentication method set and a second authentication method set, where the first authentication method set includes an authentication method preferred by the first terminal device, and the second authentication method set includes an authentication method preferred by the authentication device that is in the second network; and the core network function entity determines the first authentication method based on the first authentication method set and the second authentication method set, where the first authentication method is an authentication method preferred by both the first terminal device and the authentication device that is in the second network.

With reference to the fourth aspect, in a possible implementation, the second authentication method set is stored in the core network function entity, and/or the first authentication method set is stored in the first terminal device and/or the core network function entity.

With reference to the fourth aspect, in a possible implementation, the method further includes: the core network function entity obtains a first authentication method set and a second authentication method set, where the first authentication method set includes an authentication method preferred by the first terminal device; and the second authentication method set includes an authentication method preferred by the authentication device that is in the second network; and when there is no intersection set of the first authentication method set and the second authentication method set, the core network function entity sends the first authentication method set or a second indication to the authentication device that is in the second network, where the second indication is used to indicate the authentication device that is in the second network to negotiate an authentication method with the first terminal device.

With reference to the fourth aspect, in a possible implementation, that a core network function entity selects a first authentication method used for secondary authentication includes: The core network function entity sends a second authentication method set to the first terminal device, where the second authentication method set includes an authentication method preferred by the authentication device that is in the second network; and the core network function entity receives a first authentication method set determined by the first terminal device based on the second authentication method set, where the first authentication method set includes an authentication method preferred by the first terminal device.

With reference to the fourth aspect, in a possible implementation, the first authentication method set includes a plurality of authentication methods including the first authentication method, and the method further includes: the core network function entity determines the first authentication method based on the first authentication method set.

According to a fifth aspect, an apparatus is provided, and includes a module or unit configured to perform the method in any one of the first aspect or the possible implementations of the first aspect; or the apparatus includes a module or unit configured to perform the method in any one of the fourth aspect or the possible implementations of the fourth aspect.

According to a sixth aspect, an apparatus is provided, and includes a module or unit configured to perform the method in any one of the second aspect or the possible implementations of the second aspect.

According to a seventh aspect, an apparatus is provided, and includes a module or unit configured to perform the method in any one of the third aspect or the possible implementations of the third aspect.

According to an eighth aspect, a communication apparatus is provided. The communication apparatus may be the core network function entity in the foregoing method design, or may be a chip disposed in the core network function entity. The communication apparatus includes: a processor, coupled to a memory, where the processor may be configured to execute instructions in the memory, to implement the method performed by the core network function entity in any one of the first aspect and the possible implementations of the first aspect, or the method performed by the core network function entity in any one of the fourth aspect and the possible implementations of the fourth aspect. Optionally, the communication apparatus further includes the memory. Optionally, the communication apparatus further includes a communication interface, and the processor is coupled to the communication interface.

When the communication apparatus is the core network function entity, the communication interface may be a transceiver or an input/output interface.

When the communication apparatus is the chip disposed in the core network function entity, the communication interface may be an input/output interface.

According to a ninth aspect, a communication apparatus is provided. The communication apparatus may be the authentication device that is in the second network in the foregoing method design, or may be a chip disposed in the authentication device that is in the second network. The apparatus includes a processor, coupled to a memory, where the processor may be configured to execute instructions in the memory, to implement the method performed by the access network device in any one of the second aspect and the possible implementations of the second aspect. Optionally, the apparatus further includes the memory. Optionally, the communication apparatus further includes a communication interface, and the processor is coupled to the communication interface.

When the communication apparatus is the authentication device that is in the second network, the communication interface may be a transceiver or an input/output interface.

When the communication apparatus is the chip disposed in the authentication device that is in the second network, the communication interface may be an input/output interface.

According to a tenth aspect, a communication apparatus is provided. The communication apparatus may be the first terminal device in the foregoing method design, or may be a chip disposed in the first terminal device. The apparatus includes a processor, coupled to a memory, where the processor may be configured to execute instructions in the memory, to implement the method performed by the first terminal device in any one of the third aspect and the possible implementations of the third aspect. Alternatively, optionally, the communication apparatus further includes the memory. Optionally, the communication apparatus further includes a communication interface, and the processor is coupled to the communication interface.

When the communication apparatus is the first terminal device, the communication interface may be a transceiver or an input/output interface.

When the communication apparatus is the chip disposed in the first terminal device, the communication interface may be an input/output interface.

According to an eleventh aspect, a computer-readable storage medium is provided. The computer-readable storage medium stores instructions; and when the instructions are run on a computer, the computer is enabled to perform any method in the first aspect to the fourth aspect and the possible implementations of the first aspect to the fourth aspect.

According to a twelfth aspect, a computer program product including instructions is provided. When the computer program product runs on a computer, the computer is enabled to perform any method in the first aspect to the fourth aspect and the possible implementations of the first aspect to the fourth aspect.

According to a thirteenth aspect, a communication system is provided. The communication system includes the core network function entity, the authentication device that is in the second network, and the first terminal device.

DESCRIPTION OF EMBODIMENTS

The following describes technical solutions in this application with reference to the accompanying drawings.

The technical solutions of embodiments of this application may be applied to various communication systems, for example, a global system for mobile communications (GSM), a code division multiple access (CDMA) system, a wideband code division multiple access (WCDMA) system, a general packet radio service (CPRS), a long term evolution (LTE) system, an UE frequency division duplex (FDD) system, an LTE time division duplex (TDD) system, a universal mobile telecommunications system (UMTS), a worldwide interoperability for microwave access (WiMAX) communication system, a 5th-generation (5G) system or a new radio (NR) system, and a future 6th-generation communication system.

Some of the various communication systems operated by an operator may be referred to as an operator network. The operator network may also be referred to as a public land mobile network (PLMN), is a network established and operated by a government or an operator approved by the government to provide a land mobile communication service for the public, and is mainly a public network in which a mobile network operator (NINO) provides a mobile broadband access service for a user. The operator network or the PLMN described in embodiments of this application may be specifically a network that meets a requirement of a 3rd-generation partnership project (3GPP) standard, and is referred to as a 3GPP network. Usually, the 3GPP network is operated by the operator, and includes but is not limited to a 5th-generation (5G) mobile communication network, a 4th-generation (4G) mobile communication network, a 3rd-generation (3G) mobile communication technology network, a 2nd-generation wireless telephone technology (2G) network, and the like. For ease of description, the operator network (namely, an NINO network) is used as an example for description in the embodiments of this application.

The expansion of mobile bandwidth access services has resulted in development of NINO networks, to better support diversified business models and meet requirements for more diversified application services and more industries. To provide better and more complete services for more industries, a network architecture of a next-generation network (namely, the 5G network) is adjusted compared with that of the 4G network. For example, the 5G network splits a mobility management entity (MME) in the 4G network into a plurality of network functions including an access and mobility management function (AMF), a session management function (SW), and the like.

Figure 1:
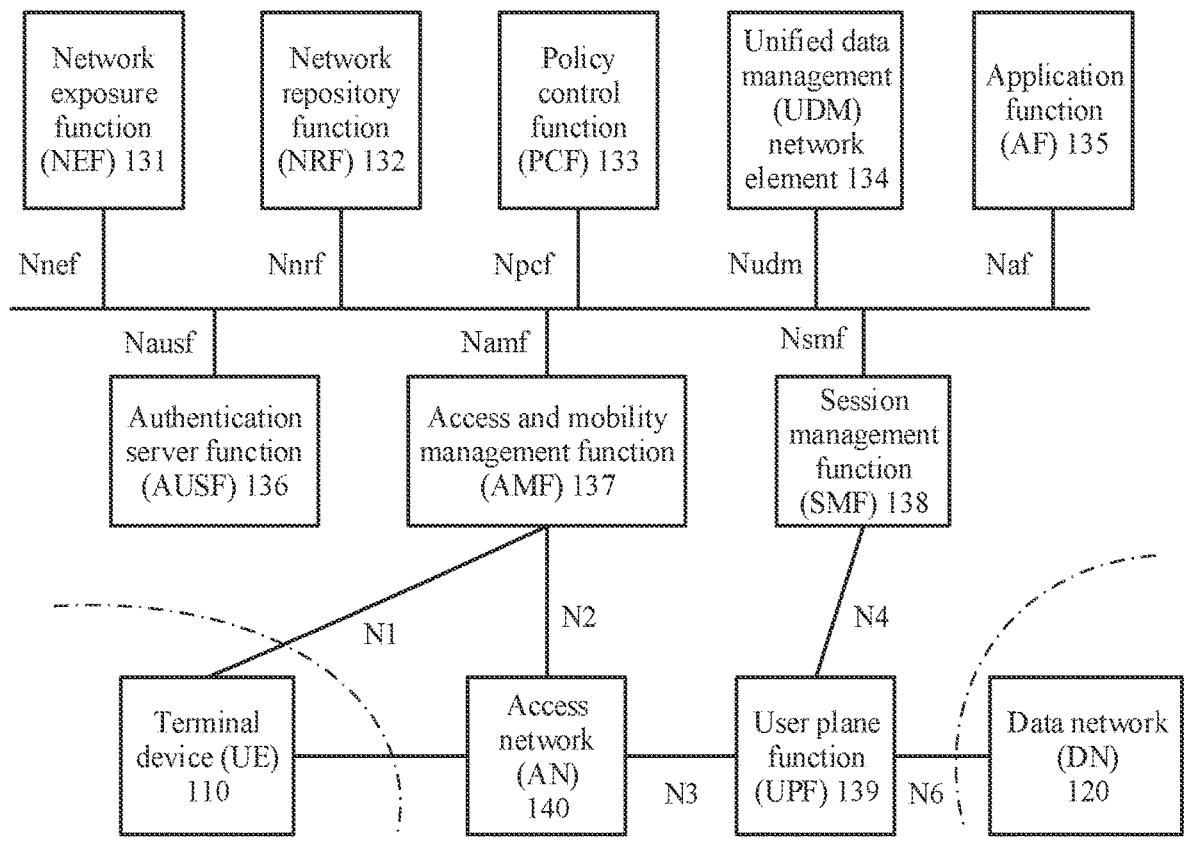
FIG. 1 is a schematic diagram of a network system architecture according to an embodiment of this application.

FIG. 1 is a schematic diagram of a network architecture according to an embodiment of this application. A 5G network architecture that is based on a service-oriented architecture and that is defined in a 3GPP standardization process is used as an example. As shown in FIG. 1, the network architecture may include three parts, which are respectively a terminal device part, an operator network, and a data network (DN).

The terminal device part includes a terminal device 110, and the terminal device 110 may also be referred to as user equipment (UE). The terminal device 110 in this embodiment of this application is a device with a wireless transceiver function, and may communicate with one or more core networks (CNs) by using an access network device that is in an access network (AN) 140. The terminal device 110 may also be referred to as an access terminal, a terminal, a subscriber unit, a subscriber station, a mobile station, a remote station, a remote terminal, a mobile device, a user terminal, a wireless network device, a user agent, a user apparatus, or the like. The terminal device 110 may be deployed on land, including an indoor device, an outdoor device, a handheld device, or a vehicle-mounted device, or may be deployed on a water surface (such as a ship), or may be deployed in the air (for example, on aircraft, a balloon, or a satellite). The terminal device 110 may be a cellular phone, a cordless phone, a session initiation protocol (SIP) phone, a smartphone, a mobile phone, a wireless local loop (WLL) station, a personal digital assistant (PDA), a handheld device with a wireless communication function, a computing device or another device connected to a wireless modem, a vehicle-mounted device, a wearable device, an unmanned aerial vehicle device or the Internet of things, a terminal in the Internet of vehicles, a terminal in any form in a 5th-generation (5G) network and a future network, relay user equipment, a terminal in a future evolved public land mobile network (PLMN), or the like. The relay user equipment may be, for example, a 5G residential gateway (RG). For example, the terminal device 110 may be a virtual reality (VR) terminal, an augmented reality (AR) terminal, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. This is not limited in this embodiment of this application.

The operator network may include a network exposure function (NEF) 131, a network repository function (NRF) 132, a policy control function (PCF) 133, a unified data management (UDM) network element 134, an application function (AF) 135, an authentication server function (AUSF) 136, an access and mobility management function (AMF) 137, a session management function (SW) 138, a user plane function (UPF) 139, a (radio) access network ((R)AN) 140, and the like. In the operator network, a part other than the (radio) access network 140 part may be referred to as a core network (CN) part or a core network part. For ease of description, in this embodiment of this application, an example in which the (R)AN 140 is a RAN is used for description.

A data network (DN) 120 may also be referred to as a packet data network (PDN), and is usually a network outside the operator network, for example, a third-party network. The operator network may access a plurality of data networks (DNs) 120. A plurality of services may be deployed on the data network (DN) 120, and the data network (DN) 120 may provide services such as data and/or voice for the terminal device 110. For example, the data network (DN) 120 may be a private network of a smart factory, a sensor installed in a workshop of the smart factory may be the terminal device 110, a control server of the sensor is deployed in the data network (DN) 120, and the control server may provide a service for the sensor. The sensor may communicate with the control server, to obtain instructions of the control server, transmit collected sensor data to the control server according to the instructions, and the like. For another example, the data network (DN) 120 may be an internal office network of a company, a mobile phone or a computer of an employee of the company may be the terminal device 110, and the mobile phone or the computer of the employee may access information, data resources, and the like on the internal office network of the company.

The terminal device 110 may establish a connection to the operator network through an interface (for example, N1) provided by the operator network, and use the services such as data and/or voice provided by the operator network. The terminal device 110 may further access the data network (DN) 120 through the operator network, and use an operator service deployed on the data network (DN) 120 and/or a service provided by a third party. The third party may be a service provider other than the operator network and the terminal device 110, and may provide the services such as data and/or voice for the terminal device 110. A specific representation form of the third party may be specifically determined based on an actual application scenario, and is not limited herein.

The following briefly describes a network function in the operator network.

The access network (RAN) 140 is a sub-network of the operator network, and is an implementation system between a service node in the operator network and the terminal device 110. To access the operator network, the terminal device 110 first passes through the RAN 140, and then may be connected to the service node in the operator network through the RAN 140. The access network device (RAN device) in the embodiments of this application is a device that provides a wireless communication function for the terminal device 110, and may also be referred to as a network device. The RAN device includes but is not limited to a next-generation node base station (gNB) in a 5G system, an evolved NodeB (eNB) in long term evolution (LIE), a radio network controller (RNC), a NodeB (NB), a base station controller (BSC), a base transceiver station (BTS), a home base station (for example, a home evolved NodeB, or a home NodeB, HNB), a baseband unit (BBU), a transmission reception point (TRP), a transmission point (TP), a pico base station device, a mobile switching center, a network device in a future network, or the like. It should be understood that a specific type of the access network device is not limited in this specification. In systems using different radio access technologies, devices with functions of the access network device may have different names. For ease of description, in all the embodiments of this application, the foregoing apparatuses that provide the wireless communication function for the terminal device 110 are collectively referred to as the access network device.

The access and mobility management function (AMF) (which may also be referred to as an AMF network function or an AMF network function entity) 137 is a control plane network function provided by the operator network, and is responsible for access control and mobility management when the terminal device 110 accesses the operator network, for example, including functions such as mobility status management, temporary user identity assignment, and user authentication and authorization.

The session management function (SMF) (which may also be referred to as an SMF network function or an SMF network function entity) 138 is a control plane network function provided by the operator network, and is responsible for managing a protocol data unit (PDU) session of the terminal device 110. The PDU session is a channel used to transmit a PDU, and the terminal device and the data network (DN) 120 need to transmit the PDU to each other through the PDU session. The SMF network function 138 is responsible for establishment, maintenance, deletion, and the like of the PDU session. The SMF network function 138 includes functions related to a session, for example, session management (for example, session establishment, modification, and release, including tunnel maintenance between the user plane function (UPF) 139 and the access network (AN) 140), selection and control of the UPF network function 139, service and session continuity (SSC) mode selection, and roaming.

The user plane function (UPF) (which may also be referred to as a UPF network function or a UPF network function entity) 139 is a gateway provided by an operator, and is a gateway for communication between the operator network and the data network (DN) 120. The UPF network function 139 includes functions related to a user plane, for example, packet routing and transmission, packet detection, service usage reporting, quality of service (QoS) processing, lawful interception, uplink packet detection, and downlink packet storage.

The unified data management (UDM) network element (which may also be referred to as a UDM network function or a UDM network function entity) 134 is a control plane function provided by the operator, and is responsible for storing information such as a subscription permanent identifier (SUPI), a credential, a security context, and subscription data of a subscriber in the operator network. The SUPI is first encrypted during transmission, and the encrypted SUPI is referred to as a subscription concealed identifier (SUCI). The information stored in the UDM network function 134 may be used for authentication and authorization when the terminal device 110 accesses the operator network. The subscriber in the operator network may be specifically a user using a service provided by the operator network, for example, a user using a SIM card of China Telecom, or a user using a SIM card of China Mobile. The subscription permanent identifier (SUPI) of the subscriber may be a number of the SIM card or the like. The credential and the security context of the subscriber may be stored small files such as an encryption key of the SIM card or information related to encryption of the SIM card, and are used for authentication and/or authorization. The security context may be cookie, a token, or the like stored in a local terminal (for example, a mobile phone) of the user. The subscription data of the subscriber may be a supporting service of the SIM card, for example, a data package or available network of the SIM card. It should be noted that the permanent identifier, the credential, the security context, the cookie, and the token are equivalent to information related to authentication and authorization, and are not limited or distinguished between each other for ease of description in the embodiments of this application. Unless otherwise specified, the security context is used as an example for description in the embodiments of this application. However, the embodiments of this application are also applicable to authentication and/or authorization information described in another expression manner.

The authentication server function (AUSF) (which may also be referred to as an AUSF network function or an AUSF network function entity) 136 is a control plane function provided by the operator, and is usually used for primary authentication, to be specific, authentication between the terminal device 110 (subscriber) and the operator network. After receiving an authentication request initiated by the subscriber, the AUSF network function 136 may perform authentication and/or authorization on the subscriber by using authentication information and/or authorization information stored in the UDM network function 134, or generate authentication and/or authorization information of the subscriber by using the LIM network function 134. The AUSF network function 136 may teed back the authentication information and/or authorization information to the subscriber.

The network exposure function (NEF) (which may also be referred to as an NEF network function or an NEF network function entity) 131 is a control plane function provided by the operator. The NEF network function 131 securely exposes an external interface of the operator network to the third party. When the SMF network function 138 needs to communicate with a third-party network function, the NEF network function 131 may serve as a relay for communication between the SMF network function 138 and a third-party network entity. When the NEF network function 131 serves as the relay, the NEF network function 131 may translate identification information of the subscriber and identification information of the third-party network function. For example, when the NEF network function 131 sends the SUPI the subscriber from the operator network to the third party, the NEF network function 131 may translate the SUI into an external identity (ID) of the SUPI. On the contrary, when the NEF network function 131 sends an external ID (an ID of the third-party network entity) to the operator network, the NEF network function 131 may translate the external ID into the SUPI.

The policy control function (PCF) (which may also be referred to as a PCF network function or a PCT network function entity) 133 is a control plane function provided by the operator, and is configured to provide a policy of the PDU session for the SMF network function 138. The policy may include an accounting-related policy, a QoS-related policy, an authorization-related policy, and the like.

A network slice selection function (NSSF) (not shown in the figure) is responsible for determining a network slice instance, selecting the AMF network function 137, and the like.

In FIG. 1, Nnef, Nausf, Nnrf, Npcf, Nudm, Naf, Namf, Nsmf, N1, N2, N3, N4, and N6 are interface sequence numbers. For meanings of these interface sequence numbers, refer to meanings defined in the 3GPP standard protocol. This is not limited herein. It should be noted that in FIG. 1, only an example in which the terminal device 110 is UE is used for description. Names of interfaces between network functions in FIG. 1 are merely examples. In specific implementation, the names of the interfaces in the system architecture may be other names. This is not specifically limited in the embodiments of this application.

A mobility management network function in the embodiments of this application may be the AMF network function 137 shown in FIG. 1, or may be another network function that has the AMF network function 137 in a future communication system. Alternatively, the mobility management network function in this application may be a mobility management entity (MME) in long term evolution (LTE), or the like.

For ease of description, in the embodiments of this application, an example in which the mobility management network function is the AMF network function 137 is used for description. Further, the AMF network function 137 is briefly referred to as an AMF, and the terminal device 110 is referred to as UE. In other words, in the embodiments of this application, all AMFs described below may be replaced with the mobility management network function, and all UEs may be replaced with the terminal device.

The network architecture (for example, the 5G network architecture) shown in FIG. 1 uses a service-based architecture and a universal interface, and a conventional network element function is split into several self-contained, self-managed, and reusable network function service modules based on a network function virtualization (NFV) technology. A service module set is flexibly defined to implement customized network function reconstruction and form a service process through unified service invoking interfaces. The schematic diagram of the network architecture shown in FIG. 1 may be understood as a schematic diagram of a service-based 5G network architecture in a non-roaming scenario. In the architecture, different network functions are combined in order based on a requirement in a specific scenario, so that a network capability and a network service can be customized, thereby deploying dedicated networks for different services, and implementing 5G network slicing. The technology of network slicing may enable the operator to more flexibly and quickly respond to customer requirements and support flexible assignment of network resources.

Network slicing is briefly understood as that a physical network of the operator is sliced into a plurality of virtual end-to-end networks. These virtual networks, including devices, and access, transport, and core networks in the networks, are logically independent, and a fault occurring on any virtual network does not affect any other virtual network. Currently, various scenarios have different requirements on a 3rd-generation partnership project (3GPP) ecosystem, for example, requirements on accounting, a policy, security, and mobility. The 3GPP emphasizes that network slices do not affect each other. For example, a large quantity of burst meter reading services should not affect normal mobile broadband services. To meet diversified requirements and slice isolation, independent management and operation and maintenance are required for services, and customized service functions and analysis capabilities are provided. Instances of different service types may be deployed on different network slices, and different instances of a same service type may also be deployed on different network slices.

A slice in the 5G network is a virtual private network including a group of network functions and a sub-network. For example, the sub-network (R)AN 140, the AMF network function 137, the SMF network function 138, and the UPF network function 139 in FIG. 1 may form a slice. In FIG. 1, only one network function of each type is schematically illustrated. During actual network deployment, there may be a plurality of, dozens of, or hundreds of network functions or sub-networks of each type. Many network slices can be deployed on the operator network. Each slice may have different performance to meet requirements of different applications and vertical industries. The operator may "customize" a slice based on requirements of customers from different vertical industries. The operator may alternatively allow some industrial customers to enjoy relatively large autonomy and participate in some slice management and control functions, Slice-level authentication is a network control function in which the industry customers participate. That is, authentication and authorization are performed on a terminal user that requests to access the slice. The slice-level authentication may be referred to as "slice authentication" for short in the embodiments of this application.

FIG. 1 is still used as an example, when the network slice is deployed on a core network (CN), and the UE 110 needs to access a network slice, the UE 110 may provide a requested network slice for the core network. The network slice requested by the UE 110 may be represented by a requested network slice set, or may be represented by requested network slice selection assistance information (requested NSSAI). The network slice set includes one or more network slices. The requested NSSAI includes one or more pieces of single network slice selection assistance information (S-NSSAI). Each piece of S-NSSAI is used to identify a network slice type, and may alternatively be understood as that the S-NSSAI is used to identify a network slice, or may be understood as that the S-NSSAI is identification information of a network slice. For ease of understanding, in the following descriptions, the "network slice" and the "S-NSSAI" are not strictly distinguished in the embodiments of this application, and the "network slice" and the "S-NSSAI" may be equally applicable. The "network slice" in the embodiments of this application may also be referred to as a "slice" or a "network slice instance", and the three have a same meaning. A unified description is provided herein. Retails are described below.

After the UE 110 sends a registration request to a network, a core network function (for example, the AMF network function 137 or the NSSF network function) performs comprehensive determination based on information such as subscription data of the UE 110, the requested NSSAI of the UE 110, a roaming protocol, and a local configuration, and selects, for the UE 110, a set of network slices allowed to be accessed. The set of network slices allowed to be accessed may be represented by allowed NSSAI, and all pieces of S-NSSAI included in the allowed NSSAI are S-NSSAI allowed, by the current operator network, to be accessed.

Before being allowed to access the network or the network slice, the UE 110 needs to perform mutual authentication with the network and/or the network slice and obtain authorization from the network and/or the network slice. Currently, in a 5G standard, the operator network directly performs authentication and authorization on the UE 110, and this type of authentication and authorization method is referred to as primary authentication.

With development of the vertical industries and the Internet of things, authentication and authorization will be also required for the UE 110 that accesses the data network (DN) 120 (for example, a DN serving the vertical industries) that is external to the operator network. For example, a commercial company provides a game platform to provide a game service for a player through the operator network. On one hand, because the UE 110 used by the player accesses the game platform through the operator network, the operator network needs to perform authentication and authorization, namely, primary authentication, on the UE 110. The player is a customer of the commercial company, and the commercial company also needs to perform authentication and authorization on the player. If the authentication is based on the network slice, or the authentication is in a unit of a slice, the authentication may be referred to as slice authentication, secondary authentication, or slice-specific authentication.

It should be noted that both the primary authentication and the secondary authentication are authentication between the UE 110 (or a user using the UE 110) and the network (the operator network or a third-party network). For example, the primary authentication is authentication between the UE and the operator network. For example, in a registration procedure of the UE 110, the operator network performs the primary authentication on the UE 110. If the primary authentication succeeds, a security context of the UE 110 may be established. For another example, the secondary authentication is authentication between the UE 110 (or a user using the UE 110) and a network (namely, the third-party network) external to the operator network, and the third-party network notifies the operator network of a result of the secondary authentication, so that the operator network authorizes or rejects the UE 110 to access an operator network serving the third-party network.

It should be noted that in the embodiments of this application, the secondary authentication may alternatively be referred to as secondary authentication for a slice, slice authentication, or identity authentication performed on a user (a user using the UE 110). A meaning of the secondary authentication is actually as follows: an authentication result of the secondary authentication performed between the UE 110 (or the user using the UE 110) and the third-party network determines whether the operator network authorizes the UE to access the slice. It should be further understood that the method applied to the secondary authentication in the embodiments of this application is also applicable to a scenario such as session-based secondary authentication or slice-specific secondary authentication. Details are not described herein.

Figure 2:
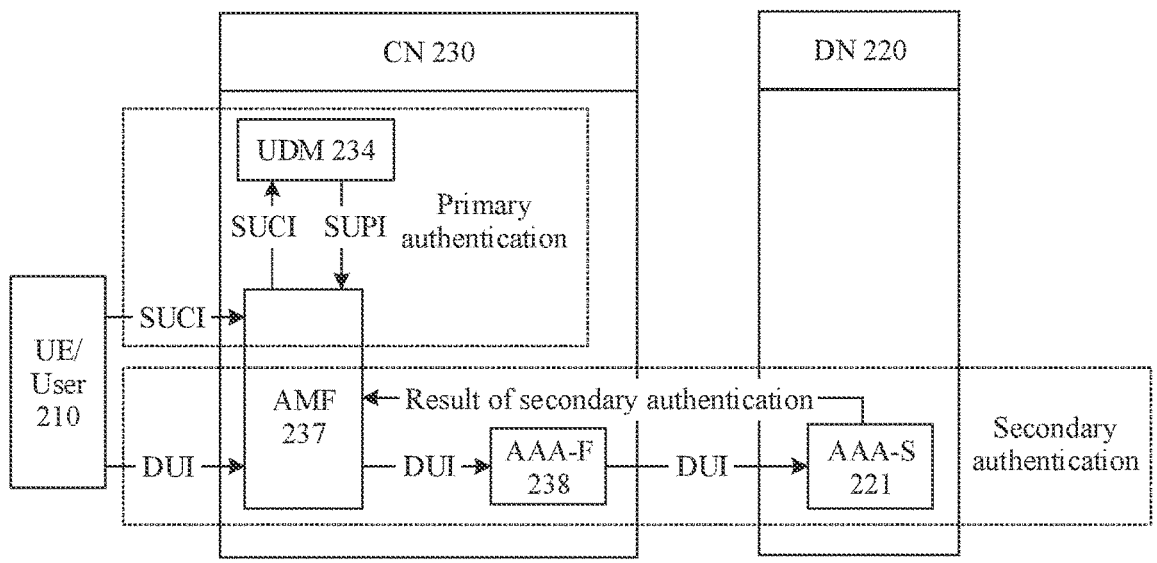
FIG. 2 is a schematic diagram of an authentication procedure between a terminal device and a network according to an embodiment of this application.

FIG. 2 is a schematic diagram of an authentication procedure between a terminal device and a network. The authentication procedure between the terminal device and the network includes a primary authentication procedure and a secondary authentication procedure. The primary authentication procedure is an authentication process between the UE and an operator network, and the secondary authentication procedure is an authentication process between the UE or a user using the UE and a third-party network. In this embodiment of this application, the description of "secondary authentication process between the UE and a third-party network" may be understood as a secondary authentication process between a user using the UE and the third-party network. As shown in FIG. 2, for example, the primary authentication procedure is an authentication process between UE 210 and a core network (CN) 230, and the secondary authentication procedure is an authentication process between a user using the UE 210 and a data network (DN) 220. Both the primary authentication procedure and the secondary authentication procedure may be understood as a part of a registration procedure of the UE 110. For ease of understanding and description, in this embodiment of this application, an example in which an authentication device in the DN 220 is an authentication, authorization, and accounting (AAA) server is used for description. The AAA server may be represented as an AAA-S (AAA server). An AAA-proxy function (AAA-F) network element may be located in the core network (CN) 230.

Refer to FIG. 2. Main steps of the registration procedure of the UE 210 may be as follows:

Step 1: The terminal device sends the network a registration request for accessing the network, where the registration request carries identity information of the terminal device. For example, the UE 210 may send the access request to an AMF network function entity 237 that is in the core network (CN) 230, where the access request carries identity information of the UE 210, for example, encrypted identity information (an SUCI) or temporary identity information such as a globally unique temporary identity (GUTI).

Step 2: The network determines, based on the identity information of the terminal device sent by the terminal device, whether to initiate primary authentication between the network and the terminal device. For example, the AMF network function entity 237 may forward the encrypted identity information (the SUCI) received from the UE 210 to a UDM network function entity 234, and the UDM network function entity 234 decrypts and restores the SUCI to obtain real identity information (an SUPI) of the UE 210, and then returns the SUPI to the AMF network function entity 237. The AMF network function entity 237 initiates a primary authentication procedure between the network and the UE 210 based on the real identity information (the SUPI) of the UE 210.

Step 3: After the primary authentication between the terminal device and the network succeeds, the network may authorize the terminal device, and allow the terminal device to access the operator network. For example, after the primary authentication succeeds, the AMF network function entity 237 authorizes the UE 210 to access the network.

After step 1 to step 3 are performed, it may be considered that the primary authentication process between the terminal device and the network is already completed. On the other hand, if the UE sends the temporary identity information (the GUTI) in step 1, the AMF checks validity of the GUTI on a side of the network in step 2. If the GUTI is valid, it indicates that the previous primary authentication is still valid, and primary authentication does not need to be performed.

Step 4: The network determines whether the terminal device further needs to perform secondary authentication. For example, the AMF network function entity 237 determines, based on local information of the AMF network function entity 237 or information about the UDM network function entity 234, whether slice authentication (that is, the secondary authentication) further needs to be performed on a slice that the UE 210 applies for access.

Step 5: If the terminal device needs to perform the secondary authentication, the network may trigger a secondary authentication procedure between the terminal device and a data network (DN). For example, when the UE 210 needs to perform the secondary authentication, the AMF network function entity 237 triggers a secondary authentication procedure between the UE 210 and the DN 220. In this embodiment of this application, an example in which the secondary authentication is the slice authentication is used. The slice authentication procedure may be an authentication procedure that uses an extensible authentication protocol (EAP) standard formulated based on a standardization organization-Internet Engineering Task Force (IETF) as a basic framework. The EAP mechanism has great flexibility and may support dozens of specific EAP authentication methods.

It should be understood that the terminal device in this embodiment of this application needs to perform the secondary authentication. It may be understood as that a user using the terminal device needs to perform the secondary authentication. For example, the secondary authentication is the slice authentication. That the UE 210 needs to perform the secondary authentication may be understood as that a user using the UE 210 needs to perform the secondary authentication.

Step 6: The terminal device and the data network complete the secondary authentication through a plurality of rounds of signaling interaction, and the data network notifies the operator network of a result of the secondary authentication, so that the operator network continues to perform another procedure based on the result of the secondary authentication, for example, a remaining registration procedure, a registration termination procedure, or another related procedure. The procedure is not listed one by one herein. For example, the secondary authentication is the slice authentication. When a user using the UE 210 and the DN 220 perform the secondary authentication, the slice authentication needs to be completed through a plurality of rounds of signaling interaction, and the DN 220 needs to obtain identity information of a user subscribed between the UE 110 and the DN 220, that is, identity information of the foregoing user using the UE 210. For ease of description, the user identity information is referred to as a DN user identity (DUI) in this embodiment of this application. In some embodiments, the user identity information may also be referred to as a user ID. The user ID used for the secondary authentication belongs to subscription information between the terminal device and an external network, and is different from subscription information of the operator network. The operator network may not necessarily have the information. FIG. 2 is used as an example, the UE 210 sends the DUI to the AMF network function entity 237 that is in the core network (CN) 230, and the AMF network function entity 237 may forward the DUI to the authentication device (for example, the AAA-S 221 shown in the figure) that is in the DN 220. After the secondary authentication succeeds, the authentication device in the DN 220 notifies the AMF network function entity 237 of the result of the secondary authentication. It should be noted that, in some embodiments, the DUI information is put into a message container and sent to an AMF, and the AMF directly forwards the container to a DN, that is, so-called "transparent transmission". In this case, the AMF does not parse the DUI information in the container, that is, the AMF does not know the DUI information of the user. In addition, in some embodiments, the DUI may be forwarded from the AMF network function entity 237 to the authentication device that is in the DN 220 by using an AAA-F 238. In this case, the primary authentication procedure and the secondary authentication procedure between the terminal device and the network are completed, and the operator network may continue to perform another registration procedure of the terminal device.

The secondary authentication process between the terminal device and the data network may be based on an EAP authentication mechanism, where the EAP authentication mechanism may support dozens of specific EAP authentication methods. Different terminal devices may support different EAP authentication methods or support a same EAP authentication method for a same data network; a same terminal device may support different EAP authentication methods or support a same EAP authentication method for different data networks; different data networks may support different EAP authentication methods or support a same EAP authentication method. A terminal device may support one or more EAP authentication methods; a data network may support one or more EAP authentication methods. However, when the terminal device and the data network perform the secondary authentication, an EAP authentication method supported by both the terminal device and the data network needs to be used. It should be understood that, in this embodiment of this application, the EAP authentication method supported by the data network may also be understood as an EAP authentication method supported by an authentication device that is in the data network. Meanings of the two expressions are the same, and no strict distinction is made in this embodiment of this application.

For example, an example in which an EAP-transport layer security (EAP-TLS) authentication method is used between the terminal device and the data network is used to briefly describe the secondary authentication procedure between the terminal device and the data network.

The following shows a process of interaction between an authenticating peer and an authenticator. The authenticating peer may be understood as the terminal device 110 in FIG. 1 or the UE 210 in FIG. 2. The authenticator may be understood as the AMF network function 137 in FIG. 1 or the AMF 237 in FIG. 2. In the following interaction process, only a part of the secondary authentication procedure between the terminal device and the data network is schematically shown, that is, an interaction procedure part between the terminal device and the operator network. It should be understood that the secondary authentication procedure between the terminal device and the data network further includes an interaction procedure part between the operator network and the data network, for example, an interaction procedure between an AMF network function and an AAA server.

| Authenticating Peer | Authenticator |
|---|---|
|  | <- EAP-Request/ Identity |
| EAP-Response/ Identity(MyID)-> |  |
|  | <- EAP-Request/ EAP-Type=EAP-TLS (TLS Start) |

-continued

| Authenticating Peer | Authenticator |
|---|---|
| EAP-Response/ EAP-Type=EAP-TLS (TLS client_hello)-> |  |
|  | <- EAP-Request/ EAP-Type=EAP-TLS (TLS server_hello, TLS certificate, [TLS server_key_exchange,] TLS certificate_request, TLS server_hello_done) |
| EAP-Response/ EAP-Type=EAP-TLS (TLS certificate, TLS client_key_exchange, TLS certificate_verify, TLS change_cipher_spec, TLS finished)-> |  |
|  | <- EAP-Request/ EAP-Type=EAP-TLS (TLS change_cipher_spec, TLS finished) |
| EAP-Response/ EAP-Type=EAP-TLS-> |  |
|  | <- EAP-Success |

It can be learned from the interaction procedure between the authenticating peer and the authenticator that, based on the EAP-TLS authentication method, the authenticating peer and the authenticator need to complete authentication through four rounds of dual signaling interaction. In the first round of signaling interaction in the authentication procedure, the authenticator usually sends a user ID request message to the authenticating peer, and requests, from the authenticating peer, an identity (for example, the UID or the user ID) of a user using the authenticating peer. After receiving the user ID request message, the authenticating peer reports the user ID to the authenticator. The authenticator then forwards the user ID to the authentication device (for example, the AAA server) that is in the data network. In the entire process, the user ID is sent by the authenticating peer to the authenticator, and then the authenticator sends the user ID to the authentication device that is in the data network. In a process in which the user ID is sent from the authenticating peer to the authentication device that is in the data network, a security protection problem of the user ID needs to be considered. Otherwise, there is a risk that the user ID may be leaked.

In an authentication method supported by the existing E. P authentication mechanism, a manner of sending the user ID varies according to a used EAP authentication method. For example, the user ID may be sent in a plaintext manner, a part of the ID may be sent, the user ID may be sent after anonymization protection, or the user ID may be encrypted before being sent. Different EAP authentication methods may use different user ID sending manners. To protect the user ID and enhance security of the user ID in a sending process, security enhancement needs to be performed to different degrees for different authentication methods. For example, for an authentication method in which the user ID is originally sent in plaintext, the user ID needs to be protected before being sent. For an authentication method in which security protection is already performed on the user ID, no additional protection mechanism needs to be further introduced. In other words, a system needs to use different user sending policy modification manners for different authentication methods. As mentioned above, the EAP authentication mechanism supports dozens of authentication methods. If different user ID sending policy modification manners need to be used for different EAP authentication methods, the secondary authentication procedure undoubtedly becomes more complex to implement. Therefore, more effective protection on the user ID is an urgent problem to be solved.

Embodiments of this application provide a secondary authentication method, so that a secondary authentication procedure between a terminal device and a network may be performed without directly sending a user ID, thereby efficiently ensuring security protection of the user ID. The following describes in detail the embodiments of this application with reference to FIG. 3.

Figure 3:
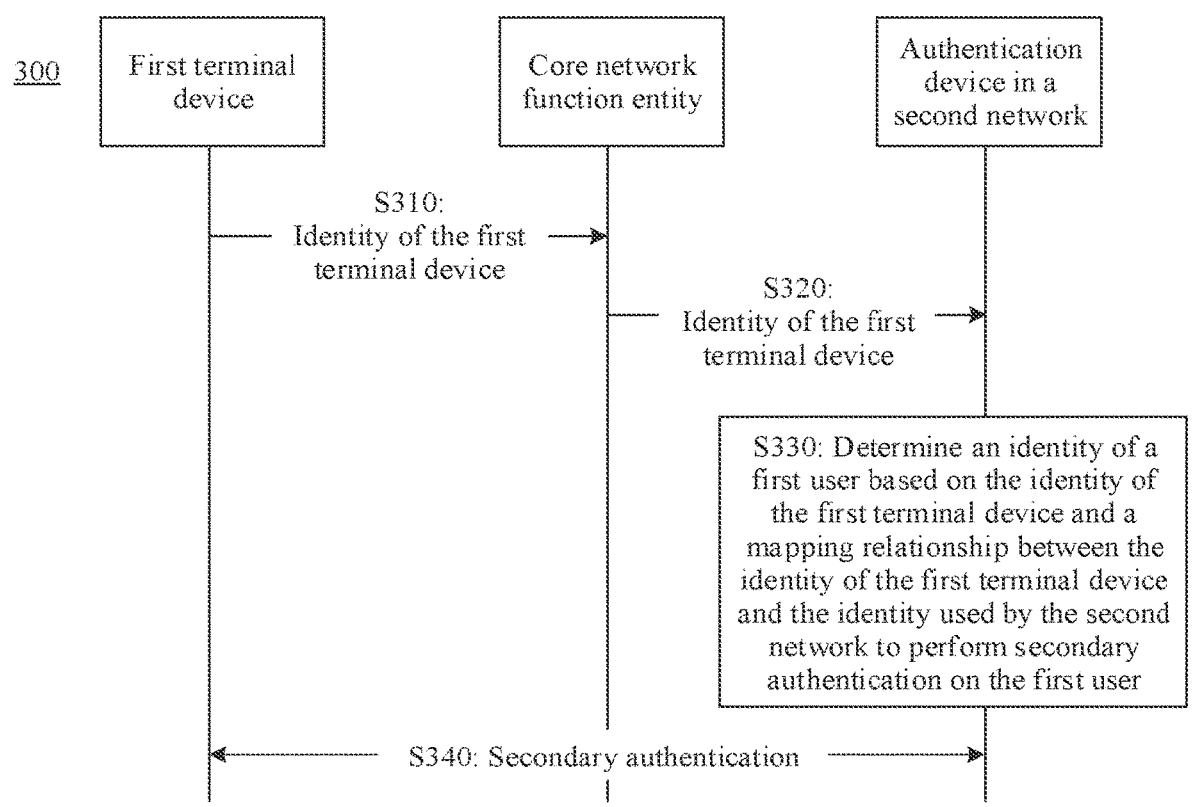
FIG. 3 is a schematic flowchart of a secondary authentication method according to an embodiment of this application.

FIG. 3 is a schematic flowchart of a secondary authentication method according to an embodiment of this application. The method 300 in FIG. 3 may be performed by a core network function entity. The core nets pork function entity may be, for example, the AMF network function entity 137 or the SME network function entity 138 shown in FIG. 1. The method 300 may include step S310 to step S340.

Step S310: The core network function entity obtains an identity of a first terminal device.

The identity of the first terminal device is an identity in a first network. The identity of the first terminal device may also be understood as an identity used by the first network to perform authentication on the first terminal device, or may be understood as an identity used by the first network to perform primary authentication on the first terminal device. In some embodiments, the identity of the first terminal device may be referred to as a UE ID.

Optionally, the first network may be the foregoing operator network, for example, a 5G network, a 4G network, or a 3G network. The core network function entity is a network function entity in the first network. In some embodiments, the core network function entity may also be referred to as a core network element.

Optionally, the core network function entity may be an access and mobility management function (AMF) (which may also be referred to as an AMF network function) or a unified data management (UDM) network element (which may also be referred to as a UDM network function).

The core network function entity obtains the identity of the first terminal device in a plurality of manners.

In an example, the core network function entity may directly obtain the identity of the first terminal device from the first terminal device. For example, in step S310, the first terminal device may send the identity of the first terminal device to the core network function entity.

In another example, the core network function entity may indirectly obtain the identity of the first terminal device. For example, in step S310, the core network function entity includes a first core network function entity and a second core network function entity, the first terminal device sends the identity of the first terminal device to the first core network function entity, and then the first core network function entity sends the identity of the first terminal device to the second core network function entity, where the second core network function entity indirectly obtains the identity of the first terminal device.

In still another example, the identity of the first terminal device may be directly stored in the core network function entity. In this case, the core network function entity may directly obtain the identity of the first terminal device from a storage apparatus of the core network function entity.

The identity of the first terminal device may be represented in a plurality of forms. For example, the identity of the first terminal device may be a subscriber permanent identifier (SUPI), a subscription concealed identifier (SUCI), a globally unique temporary identity (GUTI), a generic public subscription identifier (GPSI), or the like of a subscriber (namely, the first terminal device) in the first network. The foregoing listed identities of the first terminal device may all be referred to as UE IDs. For the first terminal device, the SUPI of the first terminal device, the SUCI of the first terminal device, the GUTI of the first terminal device, and the GPSI of the first terminal device may all be used to uniquely identify the first terminal device. Only representation forms are different, and there is a correspondence between the identities. Optionally, when the identity of the first terminal device is the GPSI, a specific form of the GPSI may be defined by the first network.

For example, the identity of the first terminal device is the GPSI. A process in which the core network function entity obtains the GPSI of the first terminal device may be as follows: the core network function entity may first obtain the SUPI of the first terminal device, and then determine the GPSI of the first terminal device based on the SUPI of the first terminal device and a correspondence between the SUPI of the first terminal device and the GPSI of the first terminal device. In other words, the core network function entity may map the obtained SUPI of the first terminal device to the GPSI of the first terminal device based on the mapping relationship between the SUPI and the GPSI.

Further, optionally, the core network function entity may first obtain the SUCI of the first terminal device, decrypt and restore the SUCI of the first terminal device to obtain the SUPI of the first terminal device, and then determine the GPSI of the first terminal device based on the SUPI of the first terminal device and the correspondence between the SUPI of the first terminal device and the GPSI of the first terminal device.

For example, if the identity of the first terminal device is the GPSI, and the core network function entity is the AMF network function entity, the first terminal device may send the SUCI of the first terminal device to the AMF network function entity. The AMF network function entity sends the SUCI of the first terminal device to the UDM network function entity for decryption. The UDM network function entity may decode and restore the SUCI of the first terminal device to obtain the SUPI of the first terminal device, and send the SUPI of the first terminal device to the AMF network function entity. The AMF network function entity maps the obtained SUPI of the first terminal device to the GPSI of the first terminal device, to obtain the identity of the first terminal device. Certainly, a process of mapping the SUPI of the first terminal device to the GPSI of the first terminal device may be completed by the UDM network function entity. To be specific, after decoding and restoring the SUCI of the first terminal device to obtain the SUPI of the first terminal device, the UDM network function entity directly maps the SUPI of the first terminal device to the GPSI of the first terminal device, and sends the AMF network function entity the GPSI that is of the first terminal device and that is obtained after the mapping. In some embodiments, the SUPI of the first terminal device may be stored in the AMF network function entity or the UDM network function entity, and the first terminal device may send indication information to the AMF network function entity or the UDM network function entity, where the indication information is used to indicate the SUPI of the first terminal device. In this case, the AMF network function entity or the UDM network function entity may map the stored SUPI that is of the first terminal device and that corresponds to the indication information to the GPSI of the first terminal device.

The GPSI is used as the identity of the first terminal device, so that privacy of the identity of the first terminal device can be ensured. This is because there is a correspondence between the GPSI and the SUPI, and the correspondence is known only by an operator, and is not disclosed to the public. In this way, when the GPSI is used in a public network or an external data network, a privacy leakage problem is not caused.

It should be understood that the core network function entity being the AMF network function entity or the UDM network function entity is merely an example, the core network function entity may also be another network function entity, and mapping the SUPI of the first terminal device to the GPSI of the first terminal device may also be completed by the another network function entity. This is not specifically limited in this embodiment of this application.

Optionally, the identity of the first terminal device may be obtained by the core network function entity in a process of performing the primary authentication on the first terminal device, or the identity of the first terminal device may be obtained by the core network function entity in another process. This is not specifically limited in this embodiment of this application.

Step S320: The core network function entity sends the identity of the first terminal device to an authentication device that is in a second network.

The identity of the first terminal device is used to determine an identity used by the second network to perform secondary authentication on a first user. In this embodiment of this application, the identity used by the second network to perform the secondary authentication on the first user may be understood as the identity of the first user, where the identity of the first user is different from the identity of the first terminal device. The identity of the first user may be understood as an identity in the second network, or may be understood as an identity of a subscriber (namely, the first user) in the second network. In other words, the identity of the first terminal device may be the identity used by the first network to perform the primary authentication on the first terminal device, and the identity of the first user may be the identity used by the second network to perform the secondary authentication on the first user.

It should be understood that, that the core network function entity sends the identity of the first terminal device to an authentication device that is in a second network may be understood as the following: the core network function entity sends the identity of the first terminal device to the second network.

Optionally, that the core network function entity sends the identity of the first terminal device to an authentication device that is in a second network includes: the core network function entity sends a secondary authentication request to the authentication device that is in the second network, where the secondary authentication request includes the identity of the first terminal device but does not include the identity of the first user. In other words, the identity of the first terminal device may be included in the secondary authentication request, and the core network function entity may send only the identity of the first terminal device to the authentication device that is in the second network, and may not send the identity of the first user.

Optionally, the second network may be a data network (DN), and the authentication device in the second network may be an AAA server (or referred to as an AAA-S).

Step S330: The authentication device in the second network determines the identity of the first user based on the identity of the first terminal device and a mapping relationship between the identity of the first terminal device and the identity used by the second network to perform the secondary authentication on the first user.

In this embodiment of this application, the authentication device in the second network may pre-establish or pre-store a mapping relationship between the identity of the first terminal device and an identity of the subscriber (namely, the identity of the first user) in the second network. In this case, the authentication device in the second network may determine the identity of the subscriber (namely, the identity of the first user) in the second network based on the identity of the first terminal device and the mapping relationship.

It should be understood that, in this embodiment of this application, the mapping relationship between the identity of the first terminal device and the identity of the first user may also be understood as a mapping relationship between the first terminal device and the first user, that is, the first terminal device and the first user may be different in concept. For example, the first terminal device may be an entity device, different terminal devices have their own identities, and the identity of the first terminal device is used to identify the first terminal device. The first user may be an account, an account number, or the like. Different users have their own identities, and the identity of the first user is used to identify the first user.

In another aspect, it should be understood that, in this embodiment of this application, the mapping relationship between the identity of the first terminal device and the identity of the first user may alternatively be understood as a mapping relationship between a subscriber (a user subscribed with an operator of the first network) using the first terminal device in the first network and a subscriber (a user subscribed with an operator of the second network) using the first terminal device in the second network, That is, use of the first terminal device in the first network and use of the first terminal device in the second network may be different in concept.

Optionally, the identity of the first terminal device may be mapped to the identity of the first user in a one-to-one manner, or in a many-to-one manner, or may be in a one-to-many manner.

In an example, the identity of the first terminal device and the identity of the first user are in a one-to-one mapping relationship. In other words, the identity of the first terminal device is mapped to the identity of the first user in a one-to-one manner, that is, the identity of the first user may be uniquely determined based on the identity of the first terminal device. In this way, after receiving the identity of the first terminal device, the authentication device in the second network may directly obtain the identity of the first user by querying the pre-stored mapping relationship.

In another example, the identity of the first terminal device and the identity of the first user are in a many-to-one mapping relationship. In other words, the identity of the first terminal device is mapped to the identity of the first user in a many-to-one manner, that is, identities of a plurality of terminal devices may all be mapped to the identity of the first user, where the identities of the plurality of terminal devices include the identity of the first terminal device. However, for any one of the plurality of terminal devices, the identity of the first user may be uniquely determined based on an identity of the terminal device. In this way, after receiving the identity of the first terminal device, the authentication device in the second network may also directly obtain the identity of the first user by querying the pre-stored mapping relationship.

In still another example, the identity of the first terminal device and the identity of the first user are in a one-to-many mapping relationship. In other words, the identity of the first terminal device is mapped to the identity of the first user in a one-to-many manner, that is, the identity of the first terminal device may be mapped to identities of a plurality of users, where the identities of the plurality of users include the identity of the first user. In this case, for the first terminal device, the identities of the plurality of users may be determined based on the identity of the first terminal device, where the identities of the plurality of users are all identities in the second network. Therefore, the identity of the first user further needs to be determined in the identities of the plurality of users.

Therefore, optionally, when the identity of the first terminal device corresponds to identities used by the second network to perform the secondary authentication on a plurality of users, and the identities of the plurality of users include the identity of the first user, the core network function entity may obtain a first indication, where the first indication is used to determine the identity of the first user in the identities of the plurality of users, or it may be understood as that the first indication is used to indicate the identity of the first user in the identities of the plurality of users. It should be understood that the plurality of users are in a one-to-one correspondence with the identities of the plurality of users, that is, each of the plurality of users corresponds to one identity. For example, sequence numbers may be pre-allocated to identities of a plurality of users mapped to a same terminal device (namely, the first terminal device). The first indication may include a sequence number corresponding to the identity of the first user. In addition to the identity of the first terminal device, the first indication further needs to be sent. The identity, of the first user, used for the secondary authentication may be uniquely determined in the identities of the plurality of users based on the sequence number that corresponds to the identity of the first user and that is in the first indication.

The core network function entity may simultaneously obtain the identity of the first terminal device and the first indication, for example, simultaneously obtain the identity of the first terminal device and the first indication in step S310. Alternatively, the core network function entity may separately obtain the identity of the first terminal device and the first indication. This is not specifically limited in this embodiment of this application. When the identity of the first terminal device and the first indication are separately obtained, the first indication may be further used to indicate that indication information in the first indication corresponds to the identity of the first terminal device.

Correspondingly, the core network function entity sends the first indication to the authentication device that is in the second network, and the authentication device in the second network may uniquely determine the identity of the first user based on the identity of the first terminal device and the first indication. Optionally, the core network function entity may simultaneously send the identity of the first terminal device and the first indication to the authentication device that is in the second network, or may separately send the identity of the first terminal device and the first indication to the authentication device that is in the second network. This is not specifically limited in this embodiment of this application.

Optionally, when the identity of the first terminal device and the identity of the first user are in a one-to-many mapping relationship, because the identity of the first terminal device may be mapped to identities of a plurality of users, the first terminal device may establish a mapping relationship between the identity of the first terminal device and the identity used by the second network to perform the secondary authentication on the first user. In this way, when the first terminal device sends the identity of the first terminal device to the core network function entity, the first terminal device may specify the identity of the first user that needs to be authenticated and that uses the first terminal device, that is, the first terminal device may determine the first indication.

Step S340: The authentication device in the second network performs the secondary authentication on the first user based on the identity of the first user.

In the step, the secondary authentication process may be an EAP authentication procedure defined in the standard. For example, the authentication device in the second network negotiates an EAP authentication method with the first terminal device. Details are not described herein.

In step S320, the core network function entity sends the secondary authentication request to the authentication device that is in the second network. Correspondingly, in step S340, the authentication device in the second network may send a secondary authentication response message to the core network function entity, where the secondary authentication response message is used to indicate the first terminal device and the second network to perform the secondary authentication on the first user.

In the secondary authentication method provided in this embodiment of this application, the core network function entity sends the identity of the first terminal device to the authentication device that is in the second network, where the identity of the first terminal device is used to determine the identity used by the second network to perform the secondary authentication on the first user. In this way, the core network function entity does not need to directly send, to the authentication device that is in the second network, the identity that is of the first user and that is used for the secondary authentication. This implicit sending manner enhances security protection of the identity of the first user, and can more efficiently and effectively protect the identity of the first user. Further, in a conventional technology, the identity of the first user is requested from the first terminal device by using the core network function entity, and the first terminal device sends the identity of the first user to the core network function entity in a request response. In the secondary authentication method provided in this embodiment of this application, the identity of the first terminal device is directly sent to the authentication device that is in the second network by using the core network function entity. In an out-of-band sending manner, messages used to request the identity of the first user from the first terminal device can be reduced, thereby improving efficiency of signaling and data interaction in a network, optimizing the secondary authentication procedure, optimizing network resources, and reducing a waste of network resources.

It should be understood that the out-of-band sending manner means that sending of the identity of the first terminal device is not in the secondary authentication procedure, that is, not in an EAP procedure, and therefore the identity of the first terminal device is not included in an EAP message.

If all terminal devices support the secondary authentication method provided in this embodiment of this application, the secondary authentication procedure may be performed on the terminal device according to the secondary authentication method 300 shown in FIG. 3. When some terminal devices do not support the secondary authentication method 300 provided in this embodiment of this application, another embodiment of this application provides a secondary authentication method 400. The following provides descriptions with reference to FIG. 4.

Figure 4:
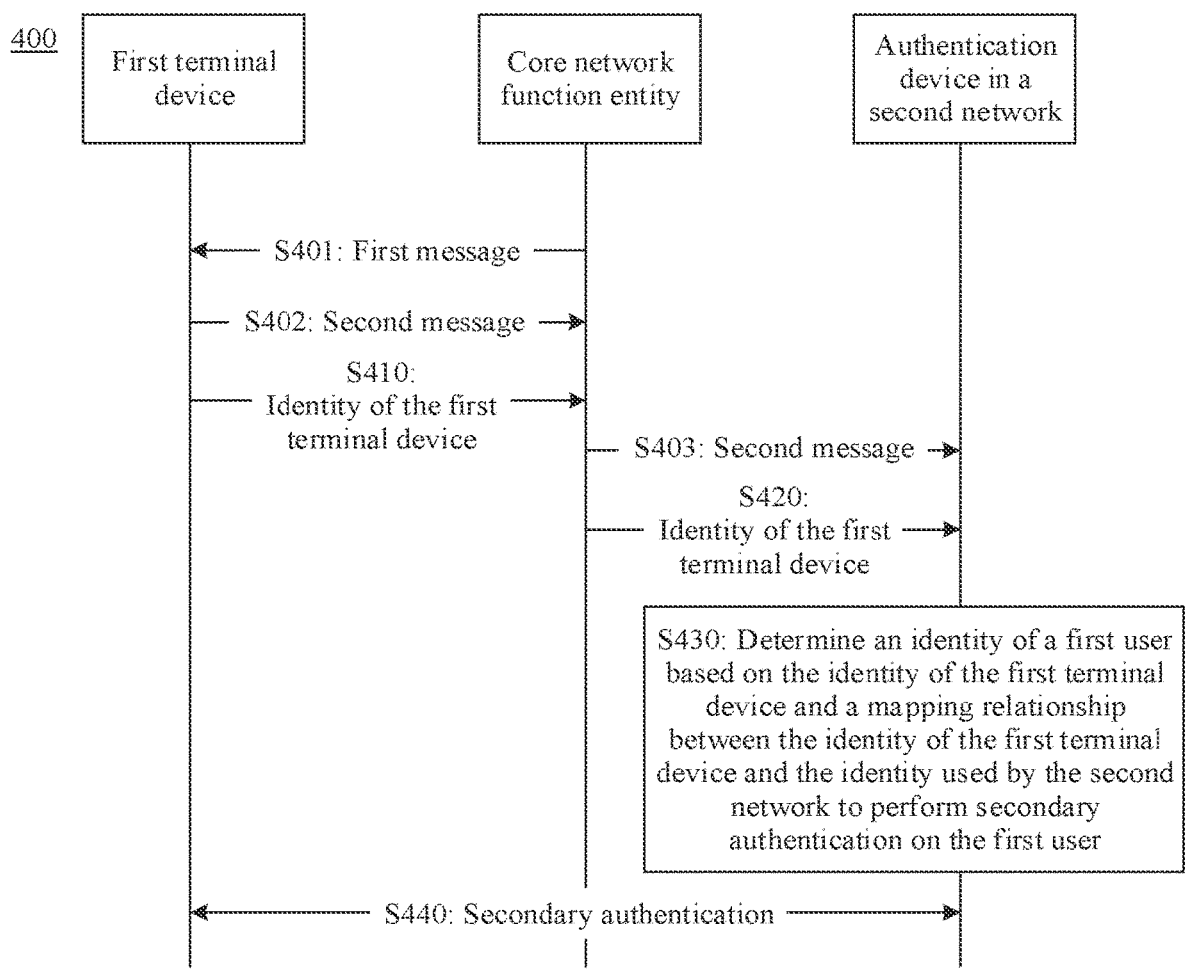
FIG. 4 is a schematic flowchart of a secondary authentication method according to another embodiment of this application.

FIG. 4 is a schematic flowchart of a secondary authentication method according to another embodiment of this application. The method 400 in FIG. 4 may be performed by a first terminal device. The first terminal device may be, for example, the terminal device 100 shown in FIG. 1 or the UE 210 shown in FIG. 2. The method 400 may include step S410 to step S440 and step S401 to step S403.

Compared with the method 300, step S410 to step S440 in the method 400 are the same as step S310 to step S340 in the method 300. For brevity, details are not described herein again. The following describes step S401 to step S403 in detail.

In this embodiment of this application, based on smooth evolution of a communication system, two different terminal devices are allowed to exist in the system: a legacy terminal device (legacy UE) and a new terminal device (new UE). The legacy terminal device supports an existing secondary authentication procedure, and the new terminal device supports the secondary authentication method 300 shown in FIG. 3. That is, the system is compatible with both the new terminal device and the legacy terminal device.

For the new terminal device, in this embodiment of this application, an example in which the first terminal device is the new terminal device is used. When secondary authentication needs to be performed on the first terminal device, a core network function entity initiates a secondary authentication procedure.

Step S401: The core network function entity sends a first message to the first terminal device.

The first message is used to request an identity of a first user from the first terminal device.

Step S402: The first terminal device sends a second message to the core network function entity.

The second message is used to indicate whether the first terminal device sends the identity of the first user. When the second message does not include the identity of the first user, the core network function entity may perform the secondary authentication on the first user based on an identity of the first terminal device. In other words, when the second message does not include the identity of the first user, the core network function entity performs step S410 to step S440. To be specific, the core network function entity obtains the identity of the first terminal device, and sends the identity of the first terminal device to an authentication device that is in a second network, so that the authentication device in the second network performs step S430, to be specific, determines the identity of the first user based on the identity of the first terminal device and a mapping relationship between the identity of the first terminal device and the identity used by the second network to perform the secondary authentication on the first user. For detailed descriptions, refer to related descriptions of the secondary authentication method 300 in FIG. 3. Details are not described herein again.

When the first terminal device is the new terminal device, the second message indicates, in a plurality of manners, that the first terminal device does not send the identity of the first user.

For example, the second message may indicate, by not including the identity of the first user in the second message, that the first terminal device does not send the identity of the first user.

For another example, the second message may include null information, and the null information is used to indicate that the first terminal device does not send the identity of the first user, or indicate that the second message does not include the identity of the first user.

For still another example, the second message may include an indicator, and the indicator is used to indicate that the first terminal device does not send the identity of the first user, or indicate that the second message does not include the identity of the first user.

Correspondingly, in step S403, the core network function entity sends the second message to the authentication device that is in the second network.

After receiving the second message, the authentication device in the second network may determine, based on the second message, whether the second message includes the identity of the first user. When the second message does not include the identity of the first user, the authentication device in the second network determines the identity of the first user based on the identity, of the first terminal device, received in step S420, to perform the secondary authentication on the first user.

For the legacy terminal device, when the secondary authentication is performed on the legacy terminal device, the authentication may be performed based on the existing secondary authentication procedure. That is, in step S402, the second message sent by the first terminal device to the core network function entity includes the identity of the first user, and the core network function entity forwards the second message to the authentication device that is in the second network. In this case, the authentication device in the second network may obtain the identity of the first user based on the second message, to directly perform the secondary authentication on the first user based on the identity of the first user. For a specific process, refer to related descriptions in FIG. 2, For brevity, details are not described herein again.

In this embodiment of this application, a secondary authentication procedure of the legacy terminal device may be the same as the existing procedure, and a secondary authentication procedure of the new terminal device is partially optimized. To be specific, assuming that the first terminal device is the new terminal device, the core network function entity still needs to request the identity of the first user from the first terminal device, but the first terminal device may not send the identity of the first user to the core network function entity, and the core network function entity may obtain the identity of the first terminal device. In this way, the core network function entity may perform the secondary authentication on the first user based on the identity of the first terminal device. Out-of-band implicit sending of the identity of the first user enhances security protection of the identity of the first user, and can more effectively protect the identity of the first user. In addition, the secondary authentication procedures of the new terminal device and the legacy terminal device may be compatible.

In the method 400 shown in FIG. 4, when the first terminal device is the new terminal device, the first terminal device has a secondary authentication procedure optimization capability, that is, can improve security protection of the identity of the first user. In a process of performing the secondary authentication procedure, the first terminal device notifies the core network function entity that the first terminal device has the secondary authentication procedure optimization capability. Certainly, before performing the secondary authentication procedure, the first terminal device may notify the core network function entity that the first terminal device has the secondary authentication procedure optimization capability.

Figure 5:
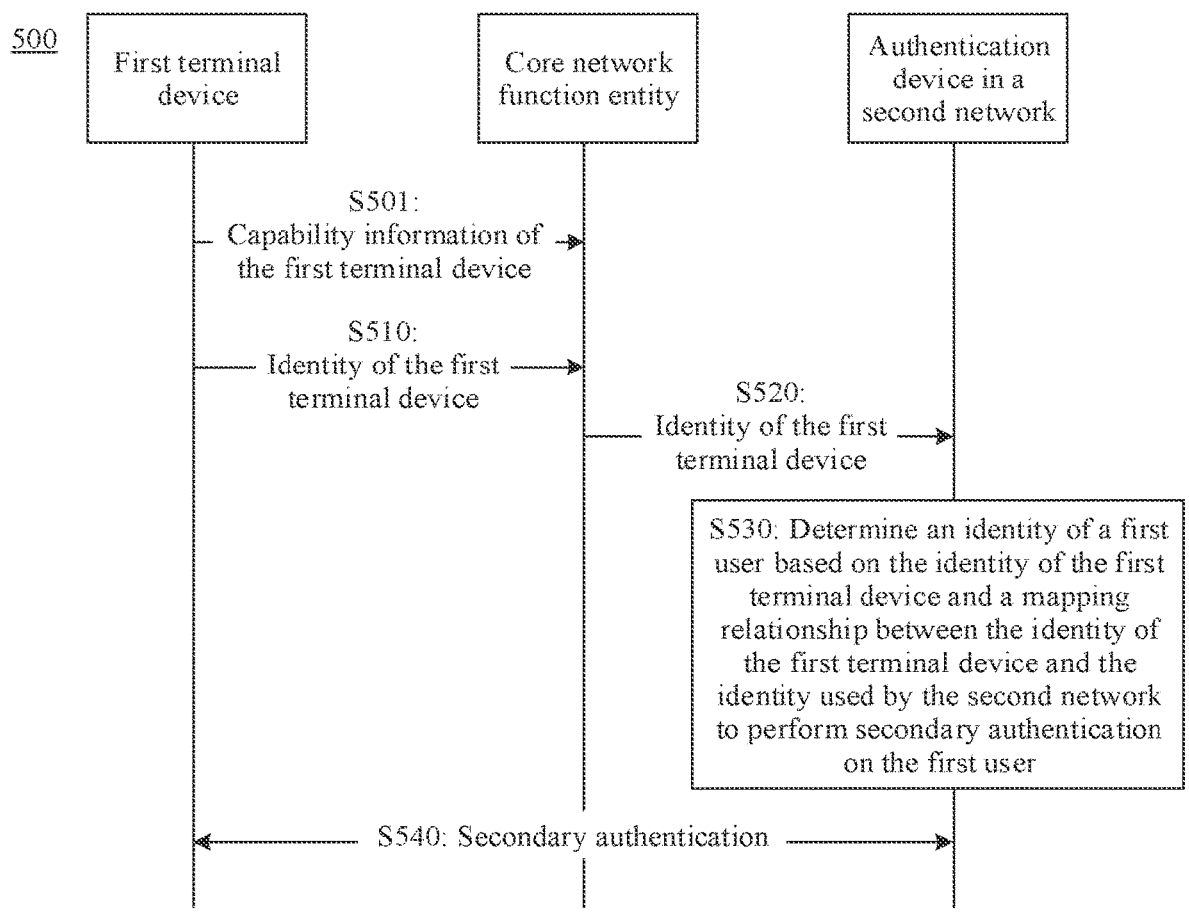
FIG. 5 is a schematic flowchart of a secondary authentication method according to another embodiment of this application.

FIG. 5 is a schematic flowchart of a secondary authentication method according to another embodiment of this application. The method 500 in FIG. 5 may be performed by a first terminal device. The first terminal device may be, for example, the terminal device 100 shown in FIG. 1 or the UE 210 shown in FIG. 2. The method 500 may include step S510 to step S540 and step S501.

Step S510 to step S540 in the method 500 are the same as step S310 to step S340 in the method 300 and step S410 to step S440 in the method 400. For brevity, details are not described herein again. The following describes step S501 in detail.

In this embodiment of this application, based on smooth evolution of a communication system, two different terminal devices are allowed to exist in the system: a legacy terminal device (legacy UE) and a new terminal device (new UE). The legacy terminal device supports an existing secondary authentication procedure, and the new terminal device supports the secondary authentication method 300 shown in FIG. 3. That is, the system is compatible with both the new terminal device and the legacy terminal device.

For the new terminal device, in this embodiment of this application, an example in which the first terminal device is the new terminal device is used. Before secondary authentication is performed on the first terminal device, the first terminal device notifies a core network function entity that the first terminal device has a secondary authentication procedure optimization capability.

That is, in step S501, the first terminal device sends capability information of the first terminal device to the core network function entity.

The capability information of the first terminal device is used to indicate that the core network function entity may perform the secondary authentication on the first terminal device based on an identity of the first terminal device. In other words, the core network function entity determines, based on the capability information of the first terminal device, to perform step S510 to step S540, without performing steps similar to step S401 and step S402 in the method 400.

Optionally, the first terminal device may be carried in a registration request message that is in a process of primary authentication performed by the first terminal device and a first network. Certainly, the first terminal device may alternatively be carried in any interaction message that is in a process of primary authentication performed by the first terminal device and a first network or that exists after the primary authentication is completed. This is not specifically limited in this embodiment of this application. In other words, sending of the capability information of the first terminal device is not in a secondary authentication procedure, that is, not in an EAP procedure.

For the legacy terminal device, because the legacy terminal device does not have a procedure optimization capability, the legacy terminal device does not support the method 300 shown in FIG. 3, and therefore does not need to send the core network function entity information related to the procedure optimization capability.

In this embodiment of this application, a secondary authentication procedure of the legacy terminal device may be the same as the existing procedure, and a secondary authentication procedure of the new terminal device is optimized. To be specific, assuming that the first terminal device is the new terminal device, before performing the secondary authentication on the first terminal device, the core network function entity sends the capability information of the first terminal device to the core network function entity, and the core network function entity may determine, based on the capability information of the first terminal device, that the first terminal device is the new terminal device, and may not request an identity of a first user from the first terminal device. However, the core network function entity may obtain the identity of the first terminal device. In this way, the core network function entity may perform the secondary authentication on the first user based on the identity of the first terminal device. Out-of-band implicit sending of the identity of the first user enhances security protection of the identity of the first user, and can more efficiently and effectively protect the identity of the first user. In addition, the secondary authentication procedures of the new terminal device and the legacy terminal device may be compatible. Further, in the secondary authentication method provided in this embodiment of this application, the identity of the first terminal device is directly sent to an authentication device that is in a second network by using the core network function entity, so that messages used to request the identity of the first user from the first terminal device can be reduced, thereby improving efficiency of signaling and data interaction in a network, optimizing the secondary authentication procedure, optimizing network resources, and reducing a waste of network resources.

In addition to the foregoing process of requesting the identity of the first user, a secondary authentication procedure performed by the second network on the first user further includes a process in which the first terminal device negotiates an authentication algorithm with the authentication device that is in the second network. Currently, because an EAP algorithm used for the secondary authentication supports dozens of authentication algorithms, the first terminal device and the authentication device that is in the second network need to determine an authentication algorithm through negotiation to complete an authentication process. Currently, a commonly used algorithm negotiation process is as follows: an authentication server in the second network initiates an authentication algorithm negotiation process, and the first terminal device negotiates with the authentication device that is in the second network. There are problems such as a long interaction process, a large quantity of occupied network resources, and a long latency. An embodiment of this application provides a secondary authentication method, to shorten an authentication algorithm negotiation interaction process, reduce a latency, and save network resources. The following provides detailed descriptions with reference to FIG. 6.

Figure 6:
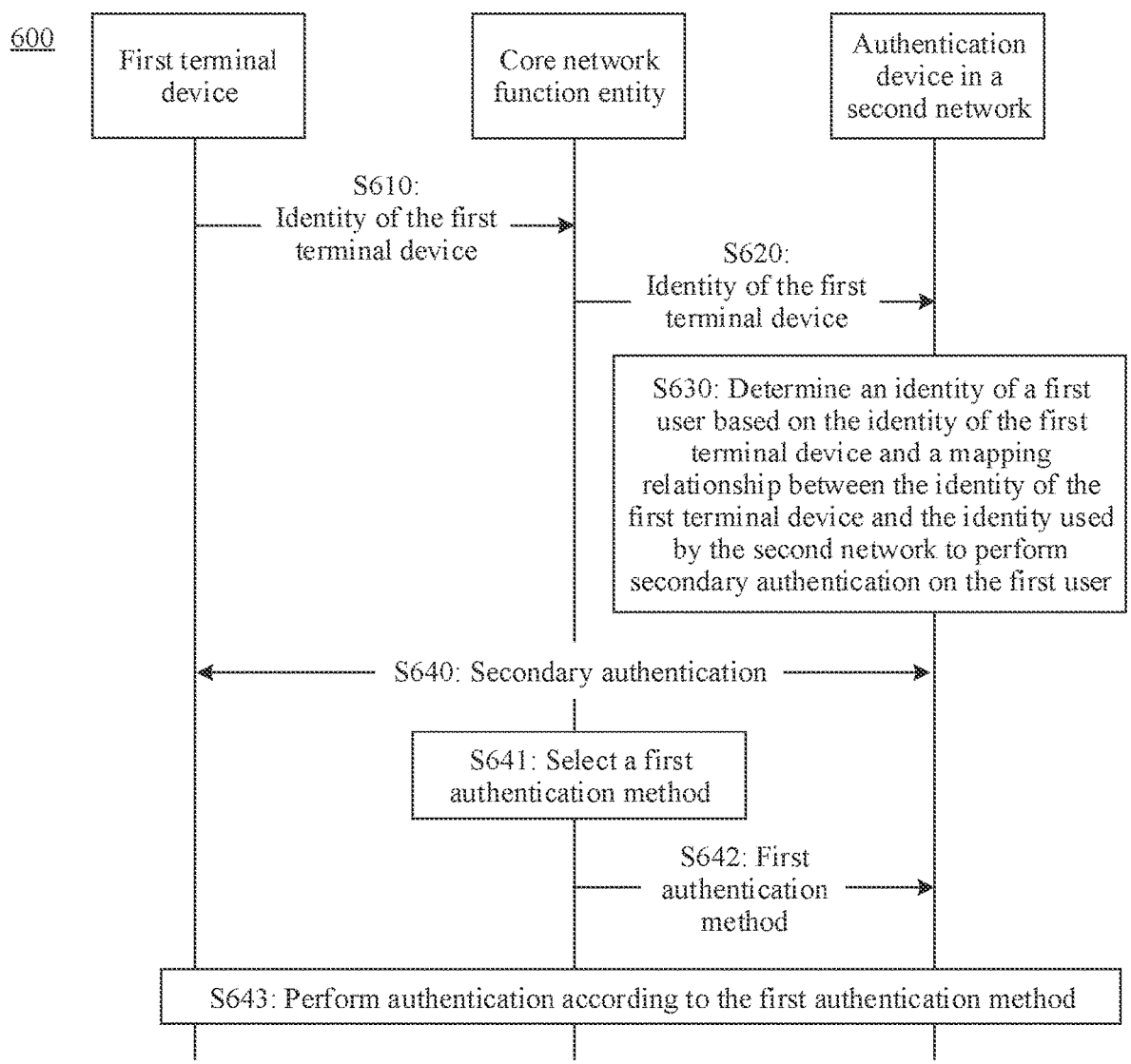
FIG. 6 is a schematic flowchart of a secondary authentication method according to still another embodiment of this application.

FIG. 6 is a schematic flowchart of a secondary authentication method according to still another embodiment of this application. The method 600 in FIG. 6 may be performed by a core network function entity. The core network function entity may be, for example, the AMF network function entity 137 or the SMF network function entity 138 shown in FIG. 1. The method 600 may include step S610 to step S640, where step S640 includes step S641 to step S643.

Compared with the method 300, step S610 to step S630 in the method 600 are the same as step S310 to step S330 in the method 300. For brevity, details are not described herein again. The following describes step S641 to step S643 in step S640 in detail. It should be noted that, in some embodiments, step S641 to step S643 in the method 600 may alternatively be performed in an existing secondary authentication procedure, and step S620 and step S630 in this embodiment of this application are not performed in the existing secondary authentication procedure.

Step S640 includes step S641 to step S643.

Step S641: The core network function entity selects a first authentication method used to perform secondary authentication on a first user.

The first authentication method is an authentication method supported by both a first terminal device and an authentication device that is in a second network.

Step S642: The core network function entity sends the first authentication method to the authentication device that is in the second network.

Step S643: The authentication device in the second network determines the first authentication method as a negotiated authentication method, and then performs authentication according to the first authentication method.

In this embodiment of this application, the core network function entity selects the authentication method supported by both the first terminal device and the authentication device that is iri the second network, sends the authentication method to the authentication device that is in the second network, and uses the authentication method as the authentication method negotiated by the first terminal device and the authentication device that is in the second network. This is equivalent to that the core network function entity completes an authentication algorithm negotiation procedure, and there is no need for the first terminal device to negotiate with the authentication device that is in the second network, thereby shortening a message interaction procedure, reducing a latency, and saving network resources.

Figure 7:
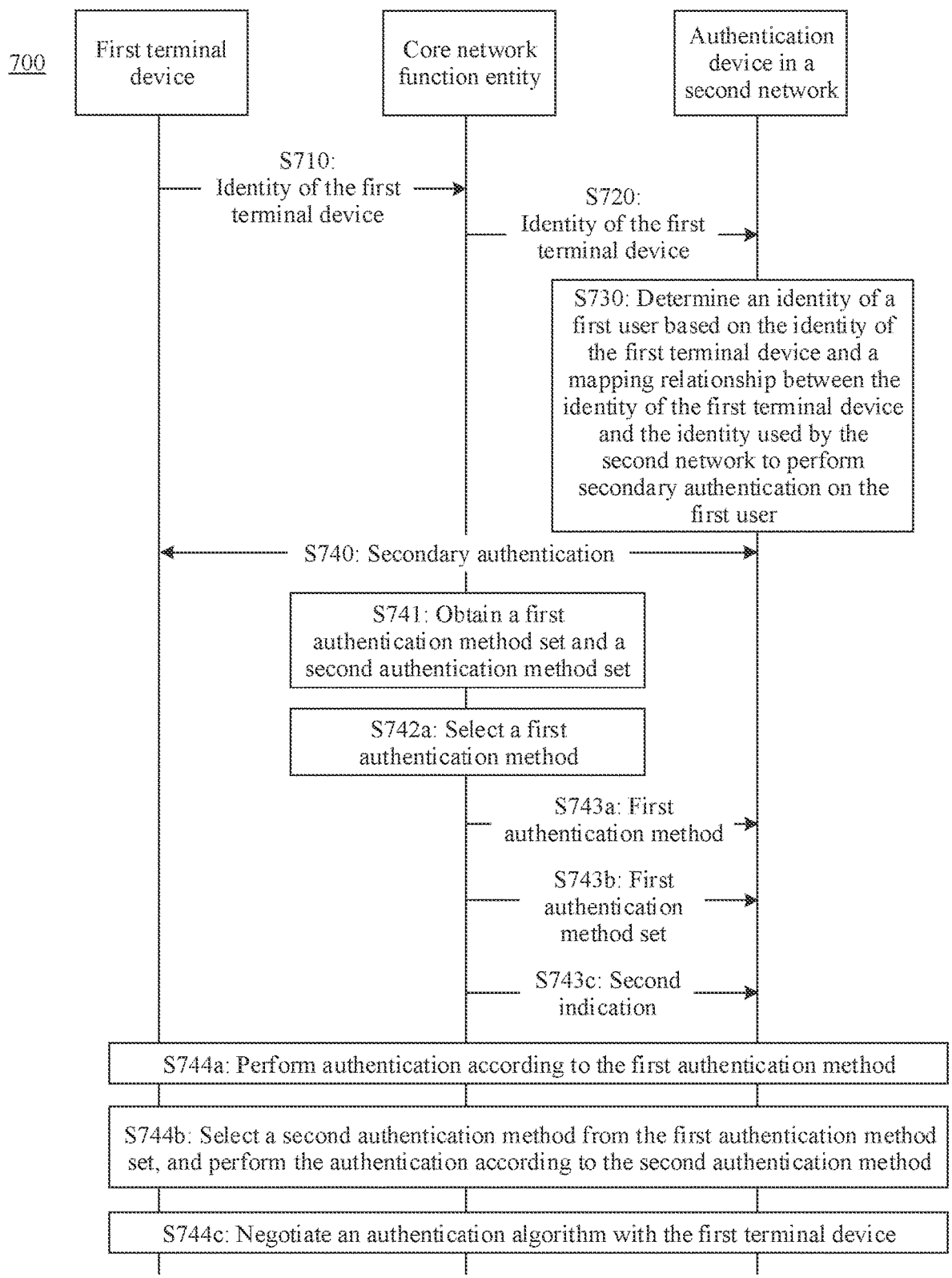
FIG. 7 is a schematic flowchart of a secondary authentication method according to still another embodiment of this application.

FIG. 7 is a schematic flowchart of a secondary authentication method according to still another embodiment. The figure shows an example of a process in which a core network function entity selects a first authentication method.

Refer to FIG. 7, The method 700 shown in FIG. 7 may include step S710 to step S740, where step S740 includes step S741 to step S744c. Step S710 to step S730 are the same as step S610 to step S630 in the method 600. For brevity, details are not described herein. The following describes step S741 to step S744c in step S740 in detail.

Step S741: The core network function entity Obtains a first authentication method set and a second authentication method set.

The first authentication method set includes an authentication method preferred by a first terminal device, and the second authentication method set includes an authentication method preferred by an authentication device that is in a second network.

The first authentication method set may be stored in the first terminal device and/or the core network function entity. The second authentication method set may be stored in the core network function entity and the authentication device that is in the second network.

Step S742a: The core network function entity determines the first authentication method based on the first authentication method set and the second authentication method set, that is, the core network function entity selects the first authentication method.

If there is an intersection set of the first authentication method set and the second authentication method set, the core network function entity may determine that the intersection set of the first authentication method set and the second authentication method set is an authentication method preferred by both the first terminal device and the authentication device that is in the second network.

Step S743a: The core network function entity sends the first authentication method to the authentication device that is in the second network.

Step S744a: The authentication device in the second network performs authentication according to the first authentication method.

The first authentication method may be determined in a plurality of manners.

For example, in step S74a, the core network function entity may select an authentication method from the intersection set of the first authentication method set and the second authentication method set as the first authentication method, where the first authentication method may be any authentication method in the intersection set, an authentication method with a highest priority in the intersection set, or the first one available on the ordered list of authentication methods in the intersection set.

For another example, in step S743a, the core network function entity may select at least two authentication methods from the intersection set of the first authentication method set and the second authentication method set, and send the at least two authentication methods to the authentication device that is in the second network. Correspondingly, in step S744a, the authentication device in the second network may randomly select an authentication method from the at least two authentication methods as the first authentication method, and perform the authentication according to the first authentication method.

If there is no intersection set of the first authentication method set and the second authentication method set, step S742a to step S744a may not be performed after step S741, and alternatively, step S743b to step S744b may be performed.

Step S743b: The core network function entity sends the first authentication method set to the authentication device that is in the second network.

Step S744b: The authentication device in the second network selects a second authentication method from the first authentication method set, and performs the authentication according to the second authentication method.

The second authentication method is an authentication method supported by the authentication device that is in the second network.

That is when there is no intersection set of the first authentication method set and the second authentication method set, the core network function entity sends, to the authentication device that is in the second network, the authentication method (that is, the first authentication method set) preferred by the first terminal device. Although the authentication method preferred by the first terminal device is not the authentication method preferred by the authentication device that is in the second network, the authentication method preferred by the first terminal device may be the authentication method supported by the authentication device that is in the second network. Therefore, the authentication device in the second network may select, from one or more authentication methods preferred by the first terminal device, an authentication method supported by the authentication device that is in the second network as the second authentication method used in an authentication process.

Optionally, in step S744b, the authentication device in the second network may alternatively select the second authentication method from the second authentication method set, and perform the authentication according to the second authentication method.

The authentication device in the second network already knows the authentication method (that is, the second authentication method set) preferred by the authentication device that is in the second network, and although the second authentication method set is not the authentication method preferred by the first terminal device, the second authentication method set may be an authentication method supported by the first terminal device. Therefore, the authentication device in the second network may select, from one or more authentication methods preferred by the authentication device that is in the second network, an authentication method supported by the first terminal device as the second authentication method used in the authentication process.

If there is no intersection set of the first authentication method set and the second authentication method set, step S742a to step S744a may not be performed after step S741, and alternatively, step S743c to step S744c may be performed.

Step S743c: The core network function entity sends a second indication to the authentication device that is in the second network.

The second indication is used to indicate the authentication device that is in the second network to negotiate an authentication method with the first terminal device.

Step S744c: The authentication device in the second network negotiates the authentication method with the first terminal device.

That is, when there is no intersection set of the first authentication method set and the second authentication method set, the core network function entity indicates, by using the second indication, the authentication device that is in the second network to negotiate the authentication method with the first terminal device.

Optionally, the first authentication method set may include the authentication method supported by the first terminal device, and/or the second authentication method set includes the authentication method supported by the authentication device that is in the second network. A corresponding process is similar to the foregoing, and details are not described again.

Refer to FIG. 6, Step S641 to step S643 in the method 600 may be performed before step S640 (this is equivalent to step S641 to step S643 being performed before step S340 in the method 300) Optionally, step S641 to step S643 may alternatively be performed before step S440 shown in the method 400, or may be performed before step S540 shown in the method 500.

Similarly, refer to FIG. 7. Step S741 to step S744c in the method 700 may be performed before step S740 (this is equivalent to step S741 to step S744c being performed before step S340 in the method 300). Optionally, step S741 to step S744c may alternatively be performed before step S440 shown in the method 400, or may be performed before step S540 shown in the method 500.

Optionally, before step S741 is performed, the AMF may send the UE a second authentication method set preferred by a side of a network. After receiving the second authentication method set, the UE may select, based on the received second authentication method set and according to an EAP authentication method supported by the UE, an authentication method set (including one or more authentication methods) preferred by the UE and sends the authentication method set to the AMF.

For example, the UE selects or determines a preferred authentication method based on the second authentication method set, that is, the authentication method set preferred by the UE includes an authentication method, and the preferred authentication method may be an authentication method supported or preferred by the UE, and may also be the authentication method preferred by the authentication device that is in the second network. The UE sends the preferred authentication method to the AMF, and the AMF may directly forward the preferred authentication method to the authentication device that is in the second network. The authentication device in the second network may use the preferred authentication method as an authentication method negotiated by the authentication device that is in the second network and the first terminal device.

For another example, the UE selects or determines a plurality of preferred authentication methods based on the second authentication method set, that is, the authentication method set preferred by the UE includes a plurality of authentication methods, and the plurality of preferred authentication methods may be authentication methods supported or preferred by the UE, and may also be authentication methods preferred by the authentication device that is in the second network. The UE sends the plurality of preferred authentication methods to the AME In this case, the AMF may select an authentication method from the plurality of preferred authentication methods, and send the authentication method to the authentication device that is in the second network. The authentication device in the second network may use an authentication method selected from the plurality of preferred authentication methods as the authentication method negotiated by the authentication device that is in the second network and the first terminal device.

In some embodiments, step S641 to step S643 in the method 600 may alternatively be performed in an existing secondary authentication procedure, but step S620 and step S630 in this embodiment of this application may not be performed in the existing secondary authentication procedure; step S741 to step S744c in the method 700 may alternatively be performed in the existing secondary authentication procedure, but step S720 and step S730 in this embodiment of this application may not be performed in the existing secondary authentication procedure. A process is the same as that described above. For brevity, details are not described again. For details, refer to the foregoing related descriptions.

The following describes some specific non-limitative examples in the embodiments of this application in more detail with reference to FIG. 8 to FIG. 11A and FIG. 11B. In FIG. 8 to FIG. 11A and FIG. 11B, descriptions are provided by using an example in which a first terminal device is UE, a core network function entity is an AMF network function entity (or an AMF for short), an identity of the first terminal device is a GPSI, an identity used by a second network to perform secondary authentication on a first user is a user ID, a first network is an operator network, the second network is a data network, an authentication device in the second network is an AAA-S (that is, an AAA server), and a secondary authentication mechanism is an EAP authentication mechanism. However, it should be understood that, secondary authentication procedures shown in FIG. 8 to FIG. 11A and FIG. 11B are merely examples. The first terminal device, the core network function entity, the identity of the first terminal device, the identity used by the second network to perform the secondary authentication on the first user, the first network, the second network, and the authentication device in the second network may alternatively be those mentioned in the foregoing descriptions. Details are not described herein again.

Figure 8:
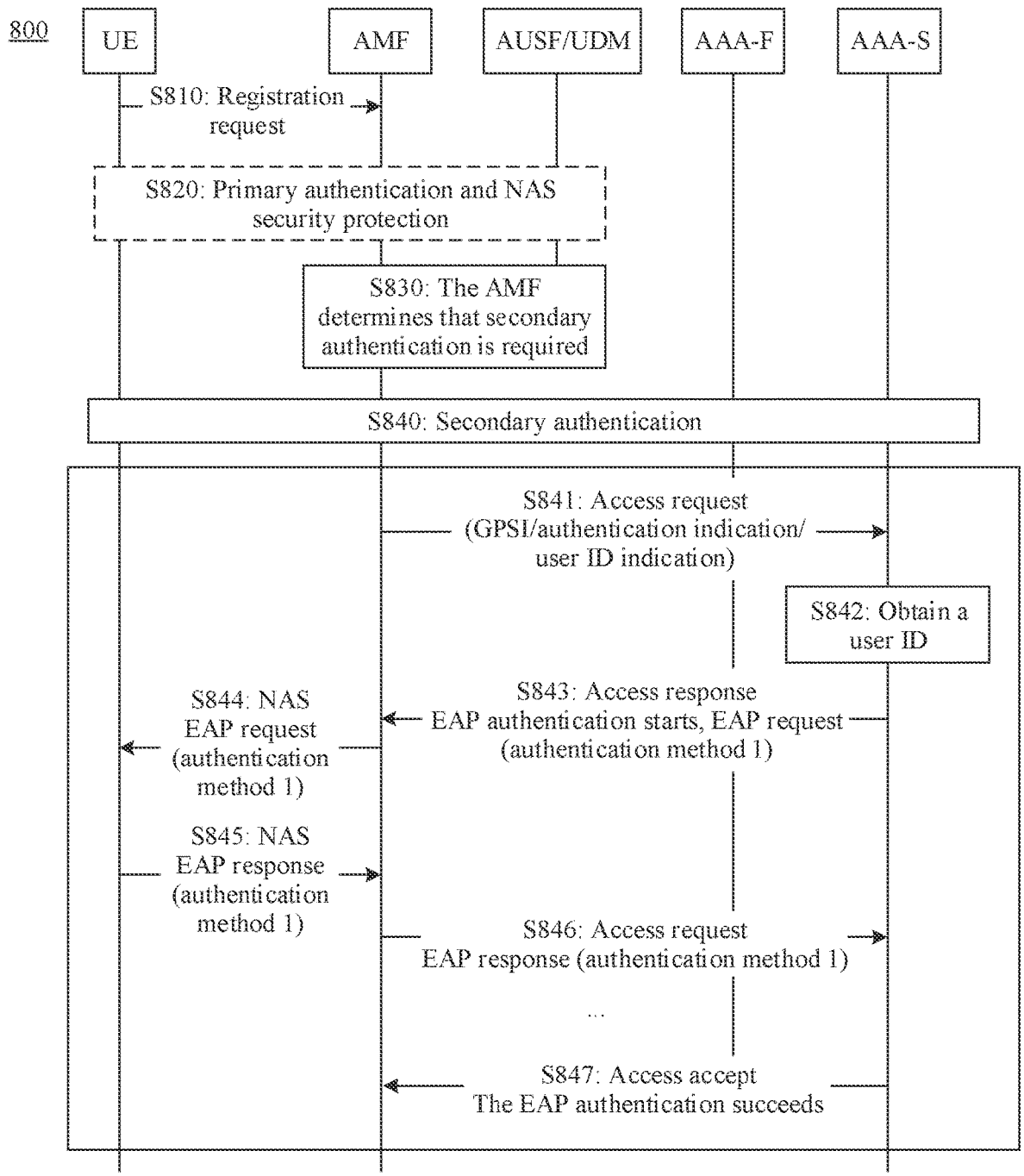
FIG. 8 is a schematic flowchart of a secondary authentication method according to yet another embodiment of this application.

FIG. 8 is a schematic flowchart of a secondary authentication method according to yet another embodiment of this application. Refer to FIG. 8. In this embodiment of this application, an initial EAP message (that is, an EAP request/response) in an EAP authentication mechanism is optimized, that is, an ID request and an ID response are not sent in the EAP message. It should be understood that, the ID request and the ID response herein respectively refer to a user ID request and a user ID response. An AAA-S obtains user ID information from a GPSI sent by an AMF to the AAA-S, instead of requesting the user ID information from UE by using the ANTE The method 800 includes step S810 to step S840, where step S840 includes step S841 to step S847, and a specific procedure is shown in FIG. 8.

Step S810: The UE sends the AMF a registration request for accessing a network, where the registration request carries identity information, for example, encrypted identity information (an encrypted SUCI).

It should be understood that the UE may be understood as a specific example of the first terminal device in the method 300 to the method 700, and the AMF may be understood as a specific example of the core network function entity in the method 300 to the method 700.

Step S820: The UE and the AMF perform primary authentication and NAS security protection.

For example, a specific process may be as follows: The AMF determines, based on the identity information sent by the UE, whether to initiate a primary authentication procedure between the network and the UE. For example, if the UE sends the SUCI to the AMF, the AMF forwards the SUCI to a UDM, and the UDM decrypts and restores the SUCI to obtain a real identity SUPI of the UE, and then returns the SUPI to the AMF. The AMF initiates the primary authentication based on the SUPI.

After step S820, that is, after the primary authentication succeeds, the AMF authorizes the LIE to access the network. The AMF determines, based on local information of the AMF or information about the LAW, whether the UE further needs to perform secondary authentication.

Step S830: The AMF determines that the UE needs to perform the secondary authentication.

Step S840: The AMF triggers a secondary authentication procedure between the UE and a DN (namely, the AAA-S) to perform the secondary authentication.

In a process of performing the secondary authentication on the UE, step S840 may further include step S841 to step S847.

Step S841: The AMF sends the GPSI to the AAA server (AAA-S) located in the DN.

Optionally, the AMF sends a user ID indication to the AAA-S located in the DN. The user ID indication may be understood as the foregoing first indication.

Optionally, the AMF sends an authentication indication to the AAA-S located in the DN.

Step S842: The AAA-S determines, based on a received message type and/or the received authentication indication, that the message is an EAP authentication request message. The AAA-S obtains a user ID used for the secondary authentication based on the GPSI or based on the GPSI and the user ID indication. For example, the AAA-S pre-stores a correspondence between the GPSI (or the GPSI and the user ID indication) and the user ID, and obtains, based on the correspondence and the GPSI, the user ID that needs to be used for the secondary authentication. The user ID may be understood as the foregoing identity of the first user, and the GPSI may be understood as a specific example of the foregoing identity of the first terminal device.

Step S843: The AAA-S initiates an EAP authentication procedure based on the obtained user ID used for the secondary authentication. The AAA-S sends an EAP request to the AMF, where the EAP request includes an EAP authentication method selected by the AAA-S, for example, an authentication method 1.

Step S844: After receiving the EAP request from the AAA-S, the AMF forwards an EAP request message to the UE by using a NAS message of an operator network.

Step S845: The UE replies an EAP response message to the AMF. If the UE agrees to use the authentication method 1, the UE replies with an acknowledgment to use the authentication method 1.

Step S846: The AMF forwards the EAP response message to the AAA-S. In addition, the AAA-S and the UE continue to perform a remaining required authentication step, that is, the ellipsis in the figure.

Step S847: If the authentication succeeds, the AAA-S sends an EAP authentication success message to the AMF. In addition, the AMF may continue to perform another registration procedure.

It should be noted that interaction between the AAA-S and the AMF tray alternatively act as a forwarder by using a proxy function AAA-F.

It should be further noted that step S841 is not included in the EAP procedure, and does not belong to the EAP message. The EAP message starts from step S843. For a conventional method, the first EAP message (that is, an EAP request (ID)) is sent from the AMF. In other words, this starts before step S841, and the first message is sent from the AMF to the UE, to request the UE to send a user ID (that is, an EAP response (ID)) of the UE. In this embodiment of this application, a process of sending the user ID (that is, an initial message EAP request (ID)/EAP response (ID) of EAP authentication) between the UE and the AAA-S is not performed. Then the AAA server is enabled to obtain the user ID in an out-of-band implicit sending manner, and this is equivalent to reusing information interaction of an existing 3GPP network and an interaction message between the existing 3GPP network and the AAA server, to notify the AAA server of the user ID used by the UE in the secondary authentication, thereby avoiding a problem that user privacy is leaked by sending the user ID and saving network resources. Specifically, after a connection is established between the 3GPP network and the AAA server, and before performing the secondary authentication on the UE (or in a secondary authentication procedure), a UE IU instead of the user ID for the secondary authentication is sent to the AAA server out of the LAP procedure. If mapping from the UE ID to the user ID for the secondary authentication is established on the AAA server, the AAA server can directly convert the UE ID to the user ID without interacting LAP request and EAP response messages in the EAP procedure to obtain the user ID. Therefore, the network resources are saved, and security protection of the user ID is effectively ensured.

Figure 9:
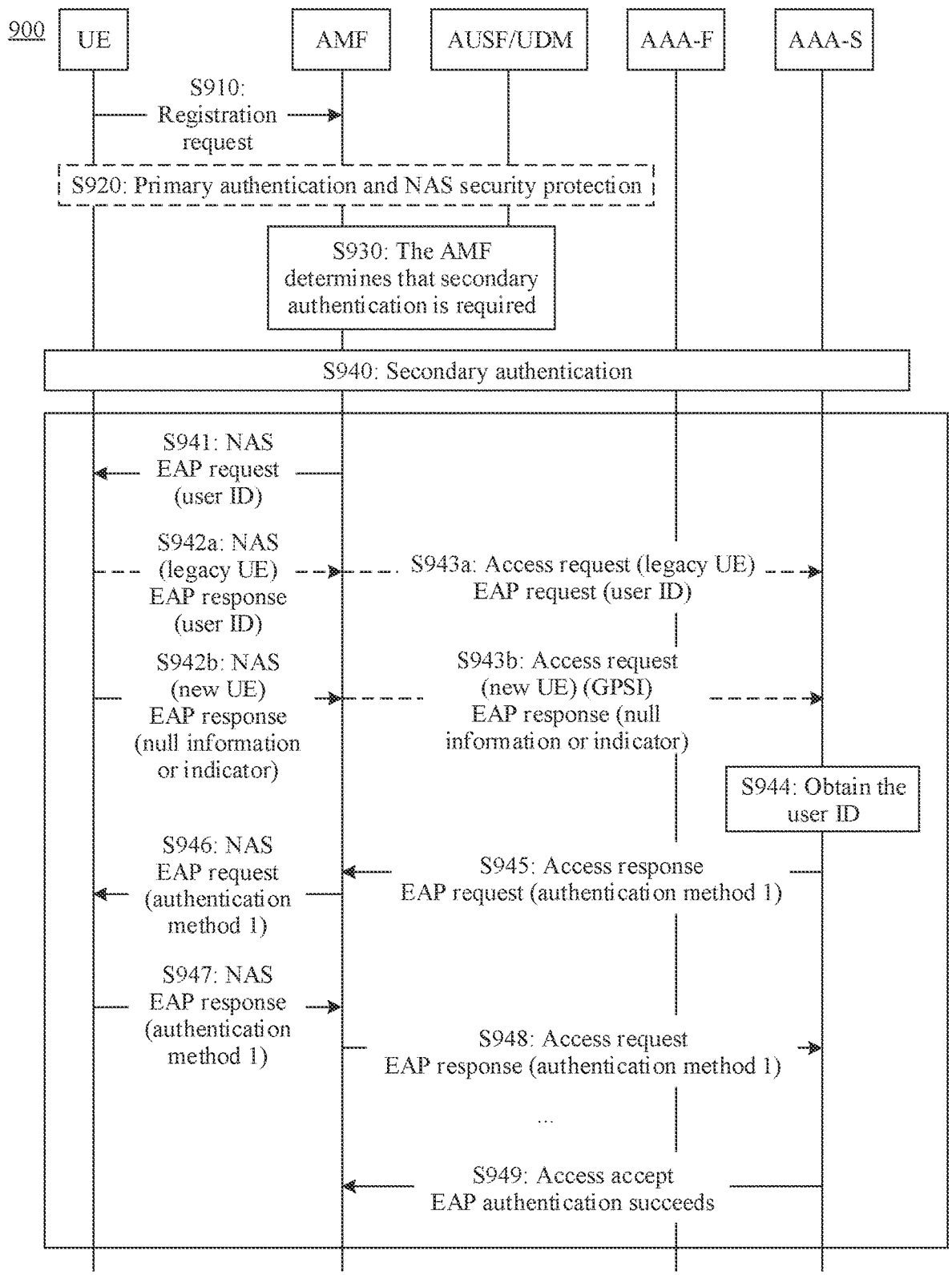
FIG. 9 is a schematic flowchart of a secondary authentication method according to yet another embodiment of this application.

FIG. 9 is a schematic flowchart of a secondary authentication method according to yet another embodiment of this application. Refer to FIG. 9. In this embodiment of this application, an initial EAP message (that is, an EAP request/response) in an EAP authentication mechanism is optimized. In this embodiment of this application, two different types of UE are allowed to exist in a system: one type is legacy UE still using an original EAP method, and the other type is new UE allowing optimization performed on the initial EAP message. This assumption is mainly based on smooth evolution of the system. That is, the system is compatible with both the legacy UE and the new UE. The method 900 includes step S910 to step S940, where step S940 includes step S941 to step S949, and a specific procedure is as follows:

Step S910 to step S930 are the same as step S810 to step S830 in the method 800. Descriptions are omitted herein. For details, refer to the foregoing related descriptions.

After an AMF determines that UE needs to perform secondary authentication, in step S940, the AMF triggers a secondary authentication procedure between the UE and a DN to perform the secondary authentication. In a process of performing the secondary authentication on the UE, step S940 may further include step S941 to step S949.

Step S941: Like an existing authentication method, the AMF initiates an EAP authentication procedure, that is, sends an EAP request message to the UE, to request the UE to send a user ID, of the UE, used for the secondary authentication.

Step S942a: For existing UE (that is, the legacy UE), the UE still uses the existing authentication method, that is, returns an EAP response message to the AMF, and includes the user ID used for the secondary authentication in the message. The message is forwarded by the AMF to an AAA-S in step S943a. Step S944: The AAA-S directly obtains the user ID.

Step S942b: For UE having an optimization capability (that is, the new UE), the UE does not include information about the user ID in the EAP response message, or includes one piece of null information or an indicator, which is used to indicate that the message does not include the information about the user ID. The message is forwarded to the AAA-S in step S943b.

It should be noted that, in the forwarded message in S943b, in addition to the EAP message, a GPSI may be simultaneously sent to the AAA-S, and the GPSI is used to indicate the used user ID. Step S944: The AAA-S may convert the GPSI into the user ID, so that a remaining EAP authentication procedure can be continued.

Step S945 to step S949 are the same as step S843 to step S847 in the method 800. Descriptions are omitted herein. For details, refer to the foregoing related descriptions.

In this embodiment of this application, a secondary authentication procedure of the legacy UE is not improved. However, to be compatible with a requirement of the legacy UE, an EAP procedure of the new UE is partially optimized. To be specific, two initial EAP messages still need to be sent, but privacy protection is performed for the user ID.

Figure 10:
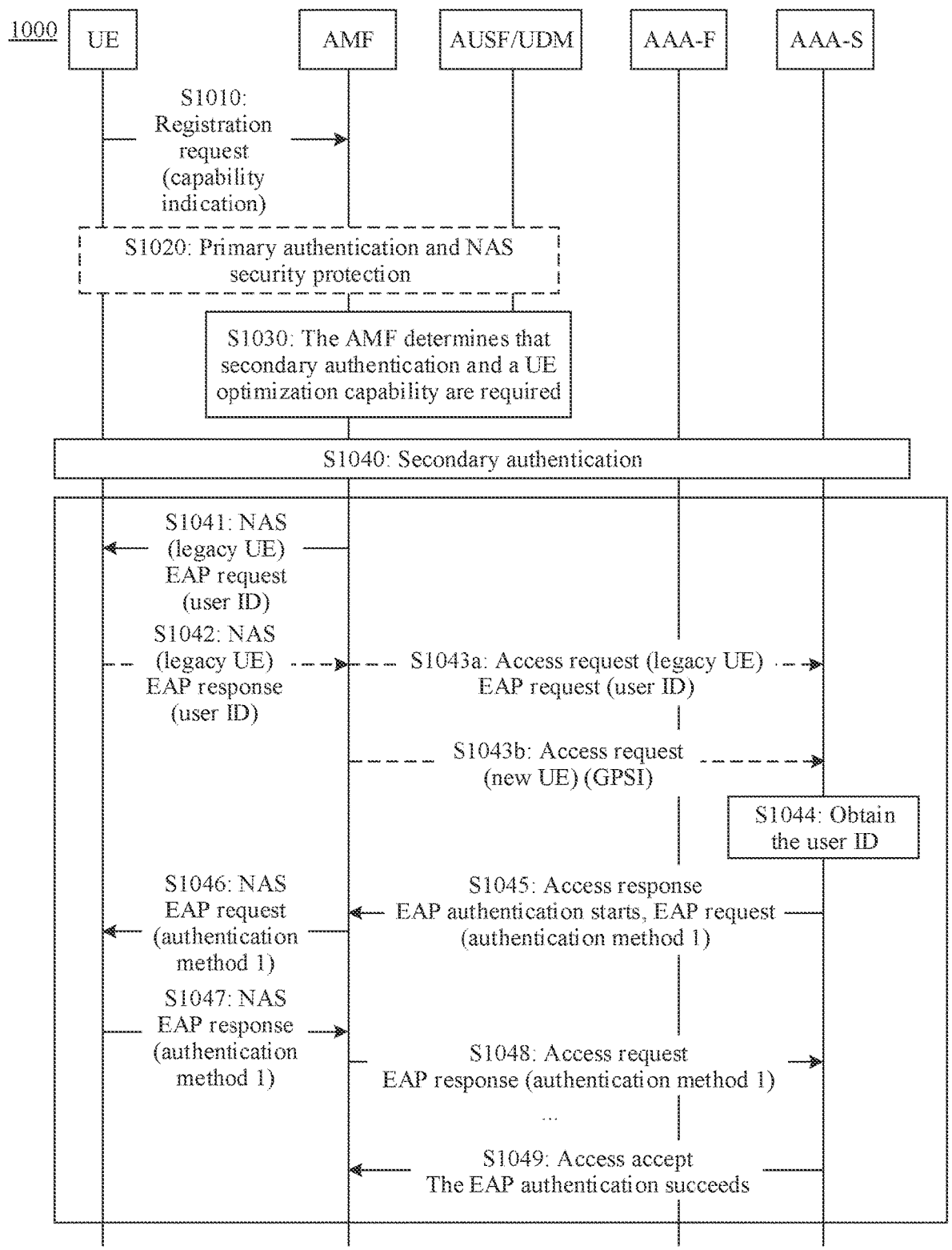
FIG. 10 is a schematic flowchart of a secondary authentication method according to yet another embodiment of this application.

FIG. 10 is a schematic flowchart of a secondary authentication method according to yet another embodiment of this application. Refer to FIG. 10. In this embodiment of this application, an initial EAP message (that is, an EAP request/response) in an EAP authentication mechanism is optimized. In this embodiment of this application, two different types of IF are allowed to exist in a system: one type is legacy UE still using an original EAP method, and the other type is new UE allowing optimization performed on the initial EAP message. This assumption is mainly based on smooth evolution of the system, that is, the system is compatible with both the legacy UE and the new UE. The method 1000 includes step S1010 to step S1040, where step S1040 includes step S1041 to step S1049, and a specific procedure is as follows:

Step S1010 to step S1030 are similar to step S810 to step S830 in the method 800. Only a difference is described herein. For details, refer to the foregoing related descriptions.

Step S1010 is similar to step S810 in the method 800. A difference lies in that, in this step, UE may include, in a registration request message, indication information indicating whether the UE has an EAP procedure optimization capability (that is, whether the UE supports a case in which the initial EAP message does not include EAP request ID and EAP response ID messages). For the legacy UE, the message does not include the capability indication.

Step S1030 is similar to step S830 in the method 800. A difference lies in that, in this step, an AMF may determine whether the UE has an EAP optimization capability. If the UE is the legacy UE but does not have the optimization capability, step S1041, step S1042, and step S1043a are performed. If the UE is the new UE and has the optimization capability, step S1043b is performed.

Step S1041, step S1042, and step S1043a are respectively similar to step S941, step S942a, and step S943a in the method 900. Detailed descriptions are omitted herein. For details, refer to the foregoing descriptions.

Step S1043b and step S1044 are similar to step S943b and step S944 in the method 900, and detailed descriptions are omitted herein. For details, refer to the foregoing descriptions.

Step S1045 to step S1049 are the same as step S945 to step S949 in the method 900. Descriptions are omitted herein. For details, refer to the foregoing related descriptions.

It should be noted that, in step S1010, the indication information indicating the UE to report the optimization capability may alternatively be included in a message in another step and be notified to the AMF. For example, in step S1020, there are a plurality of pieces of information interacted between the UE and the AMF. The indication may alternatively be included in any message and be notified to the AMF. This is not limited herein.

Figure 11A:
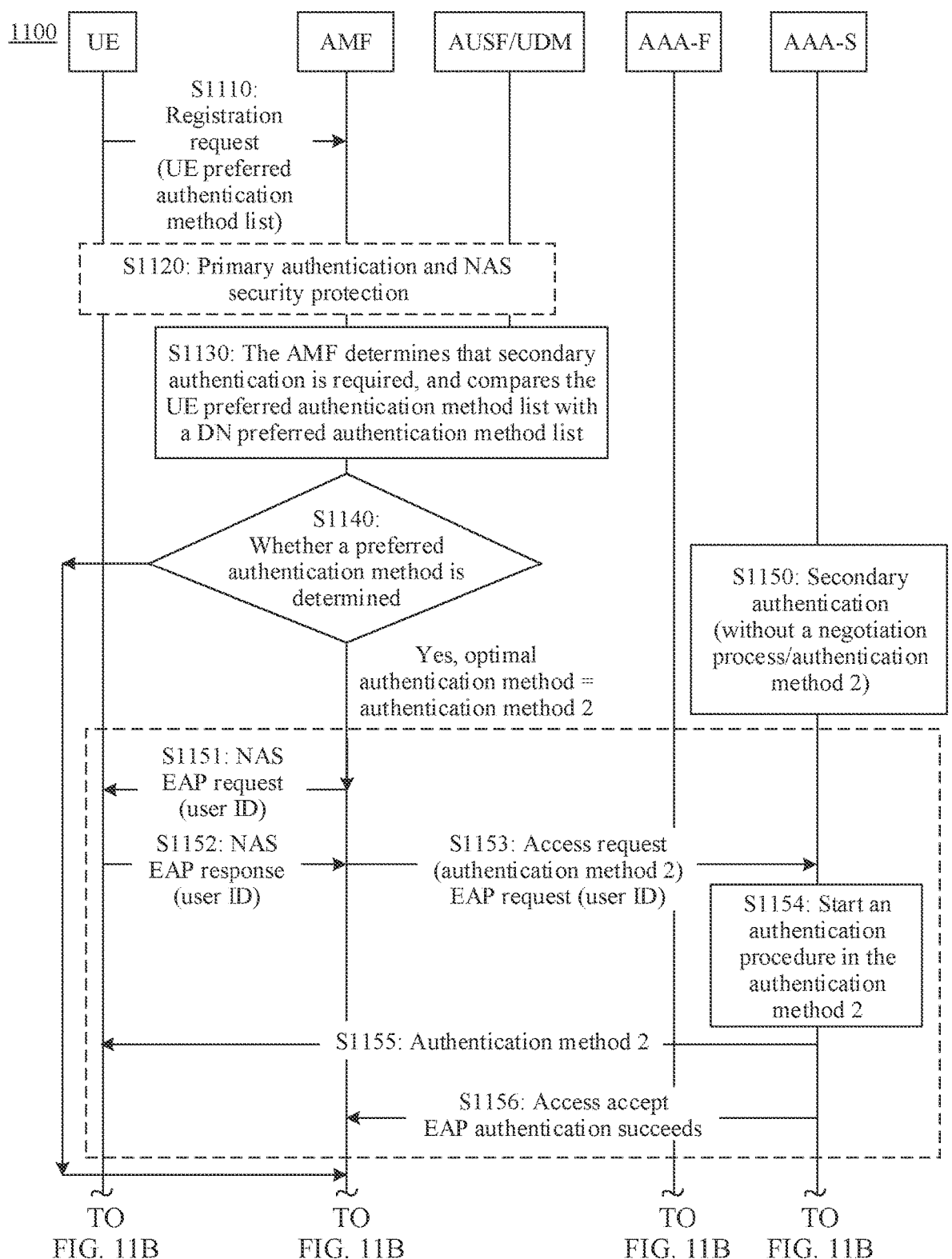
FIG. 11A and FIG. 11B are a schematic flowchart of a secondary authentication method according to yet another embodiment of this application.
Figure 11B:
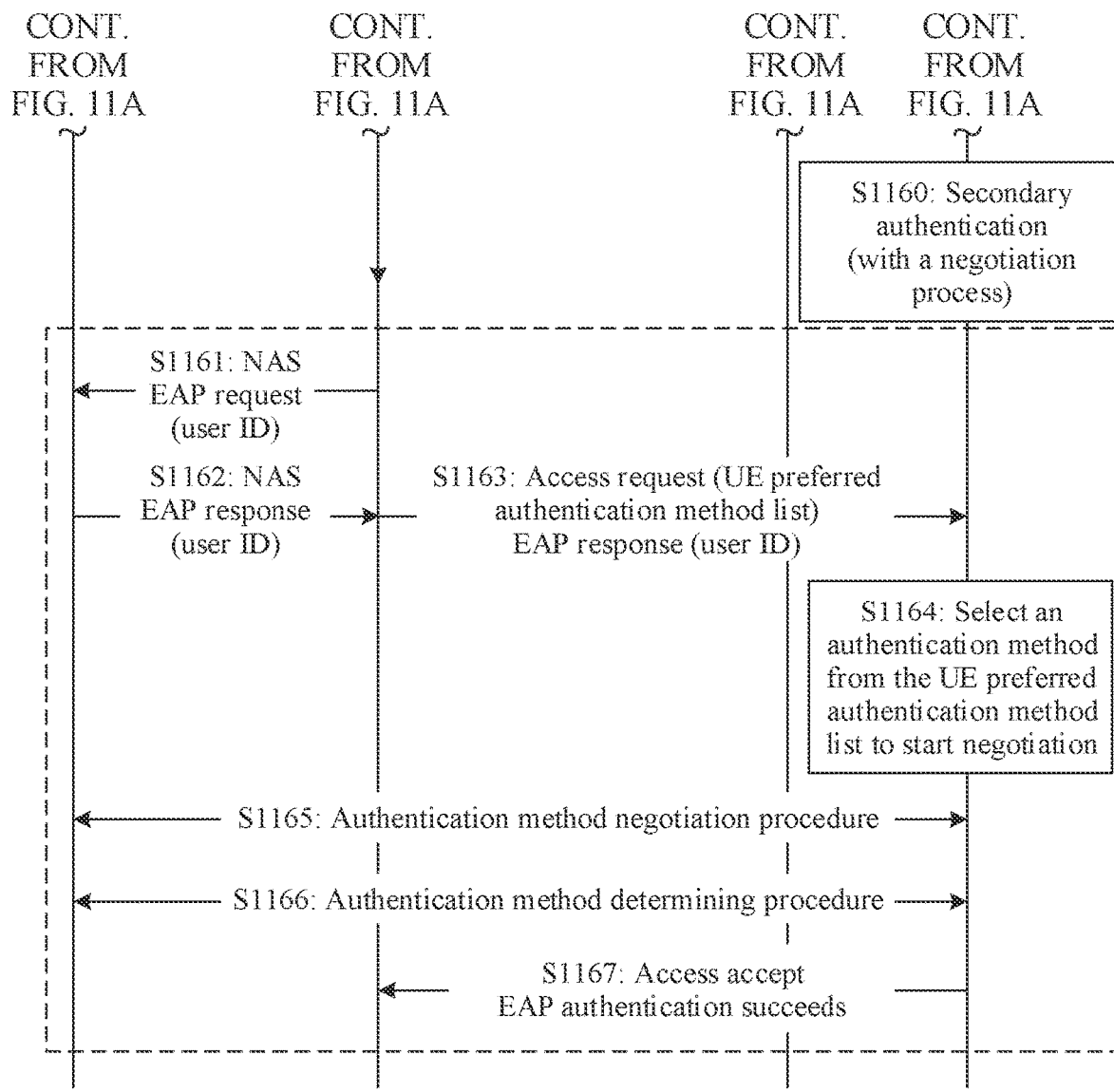

FIG. 11A and FIG. 11B are a schematic flowchart of a secondary authentication method according to yet another embodiment of this application. Refer to FIG. 11A and FIG. 11B, In this embodiment, an EAP authentication algorithm negotiation procedure is optimized. In this embodiment, negotiation of an authentication algorithm is mainly completed by using an operator network as a proxy, to shorten a message interaction process, reduce a latency, and save network resources. The method 1100 in this embodiment includes step S1110 to step S1160, where step S1150 includes step S1151 to step S1156, and step S1160 includes step S1161 to step S1167. A specific procedure is as follows:

Step S1110 to step S1130 are similar to step S810 to step S830 in the method 800. Only a difference is described herein. For details, refer to the foregoing related descriptions.

Step S1110 is similar to step S810 in the method 800. A difference lies in that, UE may also include, in a registration request message, an EAP authentication method list preferred by the UE ("UE preferred authentication method list"). A preferred authentication method may be that each slice (that is, S-NSSAI) has different preferred methods, or may be that preferred methods of all pieces of S-NSSAI are the same.

Step S1130 is similar to step S830 in the method 800. A difference lies in that, in this step, an AMF needs to further query (query the AMF or query a UDM) an authentication method list, preferred by an AAA-S, corresponding to the UE ("DN preferred authentication method list"). Compare the two lists to check whether there is an intersection set, to determine an EAP authentication method preferred by both the UE and the AAA-S. If there is more than one method, the first one available on the ordered list of methods is selected or a method with a high priority is selected.

The "UE preferred authentication method list" may be understood as the foregoing first authentication method set, and the "DN preferred authentication method list" may be understood as the foregoing second authentication method set.

Step S1140: If a preferred authentication method (which may be understood as the foregoing first authentication method) is determined in step S1130, perform a specific step in step S1150; if a preferred authentication method cannot be determined in step S1130, perform a specific step in step S1160.

Step S1150 may include step S1151 to step S1156. Step S1150 may be an existing EAP procedure based on an authentication method: "authentication method 2". Details are not described herein.

Step S1160 may include step S1161 to step S1167. Step S1160 is an existing EAP procedure in which an authentication method is negotiated first and then authentication is performed. A difference lies in that, in step S1163, an AMF sends the AAA-S the authentication method list preferred by the UE. In this way, the AAA-S may first check whether there is a method supported by the AAA-S in the preferred list. If there are one or more methods supported by the AAA-S in the preferred list, one of the methods is selected as a negotiated authentication method. Otherwise, all methods in the list are excluded, and selection of the authentication algorithm is started in step S1164.

It should be noted that the authentication algorithm may continue to be selected from methods in the AAA-S preferred list. Because although the methods are not preferred by the UE, the methods may be methods that can be supported by the UE. In addition, the AAA-S may alternatively exclude all methods in the AAA-S preferred list, and select only another method, supported by the AAA-S, outside the list to negotiate with the UE. This is not specifically limited in this embodiment of this application.

It should be further noted that, in step S1110, reporting of the "UE preferred authentication method list" by the UE may alternatively be included in a message in another step and notified to the AMF. For example, in step S1120, there are a plurality of pieces of information interacted between the UE and the AMF. The indication may alternatively be included in any message and notified to the AMF. This is not limited herein.

The method 1100 in this embodiment of this application may be used in separate combination with the method 800, the method 900, and the method 1000.

Figure 12:
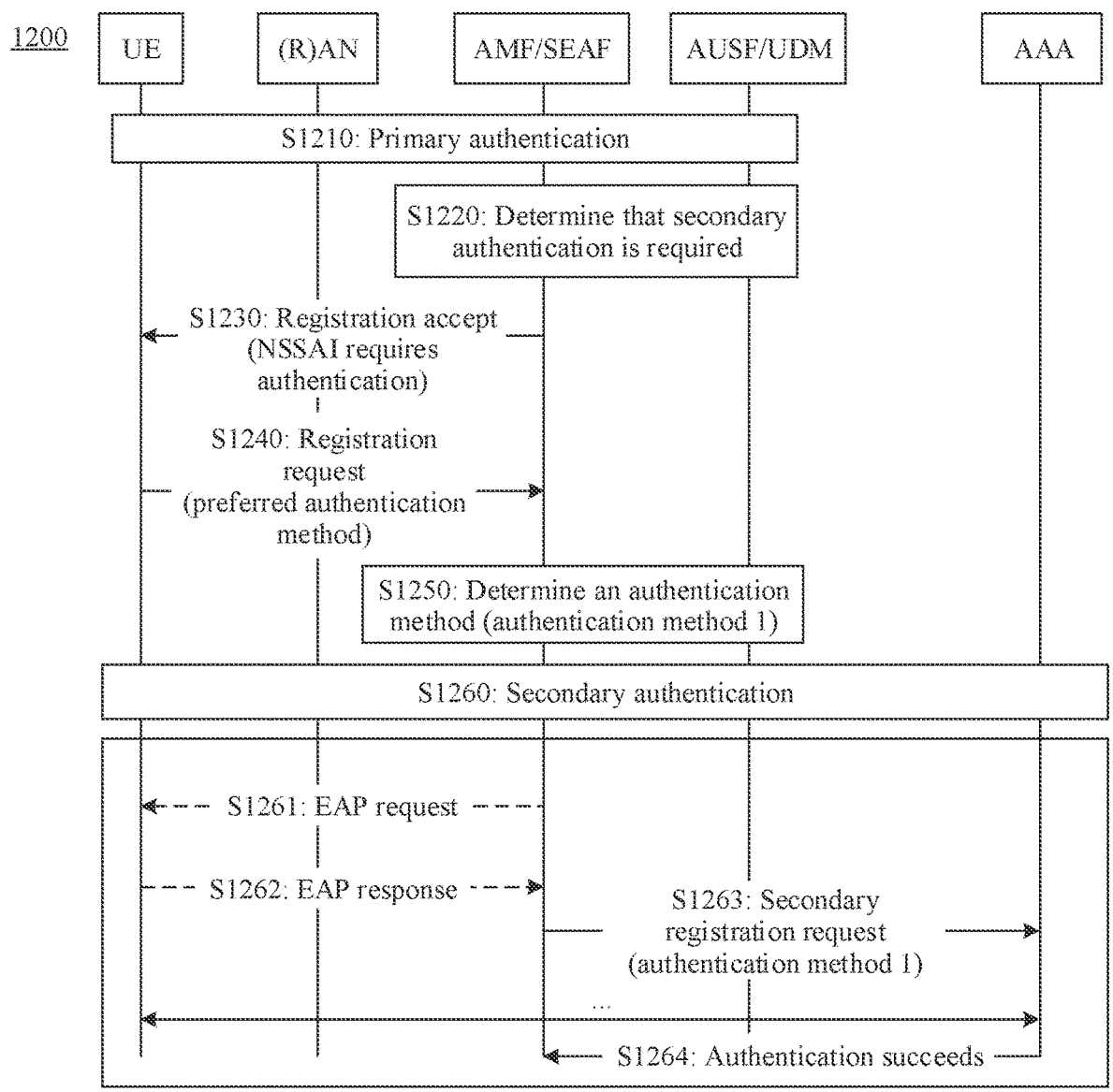
FIG. 12 is a schematic flowchart of a secondary authentication method according to yet another embodiment of this application.

FIG. 12 is a schematic flowchart of a secondary authentication method according to yet another embodiment of this application. Refer to FIG. 12. In this embodiment, an EAP authentication algorithm negotiation procedure is optimized. The method 1200 in this embodiment of this application includes step S1210 to step S1260, where step S1260 includes step S1261 to step S1264, and a specific procedure is as follows:

Step S1210: Perform primary authentication on UE (which may be understood as the foregoing first terminal device).

Step S1220: An AMF determines that the LIE needs to perform secondary authentication.

Step S1230: The AMF sends the UE a slice on which the secondary authentication needs to be performed. That is, in this step, the AMF notifies the UE of slices on which slice authentication needs to be performed.

Optionally, in step S1230, the AMF may further send the UE an authentication method set (which may be understood as the foregoing second authentication method set) preferred by an AAA server. Before step S1230, the AMF may request the authentication method set preferred by the AAA server from the AAA server, or may directly obtain the authentication method set preferred by the AAA server from another network function entity such as a UDM. This is not limited in this embodiment of this application.

Step S1240: In a registration request, the UE sends the AMF an authentication method set preferred by the UE, where the authentication method set preferred by the UE may include one or more authentication methods. Different from the method 1100, in this embodiment of this application, sending by the UE, to the AMF, the authentication method set preferred by the UE is performed before the slice authentication (an EAP procedure) and after primary authentication. However, in the method 1100, sending by the UE, to the AMF, the authentication method set preferred by the UE is performed before (or during) the primary authentication.

For example, in step S1230, if the AMF does not send the UE the authentication method set preferred by the AAA server, in step S1240, the authentication method set that is preferred by the UE and that is sent by the UE to the AMF may be a preferred authentication method set default by the UE.

For another example, in step S1230, if the AMF sends the UE the authentication method set preferred by the AAA server, in step S1240, the authentication method set that is preferred by the UE and that is sent by the UE to the AMF may be determined based on the authentication method set preferred by the AAA server. For example, the UE may determine or select the authentication method set preferred by the UE in/from the authentication method set preferred by the AAA server.

Step S1250: The AMF determines an authentication method.

Step S1260: The AMF triggers a secondary authentication procedure between the UE and the AAA server, to perform the secondary authentication.

Step S1260 may include step S1261 to step S1264, where step S1261 and step S1262 are optional steps. For a process, refer to related descriptions about the EAP request and the EAP response in the existing procedure or the foregoing method 300 to method 1100.

Step S1263: The AMF sends the AAA server the authentication method determined in step S1250, for example, an authentication method 1, and the AAA server may determine the authentication method determined in step S1250 as an authentication method negotiated by the AAA server and the UE, and then continue to perform a next procedure.

In step S1250, that the authentication method determined by the AMF is the authentication method 1 is used as an example, and the AMF may determine the authentication method in a plurality of manners.

For example, if in step S1230, the AMF sends the UE the authentication method set preferred by the AAA server, in step S1240, the UE may select or determine, from/in the authentication method set preferred by the AAA server, an authentication method supported or preferred by the UE, for example, the authentication method 1, and send the authentication method to the AMF. In step S1250, the AMF may directly forward the authentication method determined by the UE to the AAA server, and the AAA server determines, as the authentication method negotiated by the AAA server and the UE, the authentication method determined by the UE.

Alternatively, if in step S1230, the AMF sends the UE the authentication method set preferred by the AAA server, in step S1240, the UE may select or determine, front/in the authentication method set preferred by the AAA server, a plurality of authentication methods supported or preferred by the UE, and send the authentication methods to the AMF. In step S1250, the AMF may directly determine, in the plurality of authentication methods determined by the UE, an authentication method used for the secondary authentication, and forward the authentication method determined by the AMF to the AAA server. The AAA server determines, as the authentication method negotiated by the AAA server and the UE, the authentication method determined by the AMF.

In another example, if in step S1230, the AMF does not send the UE the authentication method set preferred by the AAA server, in step S1240, the UE may send the AMF the authentication method set preferred or supported by the UE. In step S1250, the AMF may determine, based on the authentication method set preferred or supported by the UE and the authentication method set preferred or supported by the AAA server, an authentication method used for the secondary authentication, and send the AAA server the authentication method determined by the AMF. The AAA server determines, as the authentication method negotiated by the AAA server and the UE, the authentication method determined by the AMF.

The method 1200 in this embodiment of this application may be used in separate combination with the method 800, the method 900, and the method 1000.

In this embodiment of this application, a terminal device sends, before an EAP procedure of slice authentication, a core network function entity an authentication method set preferred by the terminal device. Negotiation of an authentication algorithm is completed by using an operator network as a proxy, to shorten a message interaction process, reduce a latency, and save nets pork resources.

This embodiment of this application does not change the EAP procedure defined in the IETF standard. In the standard EAP procedure, an EAP request/ID, an EAP response/ID, and an EAP negotiation procedure are optional steps. In this embodiment of this application, these optional steps are avoided through information interaction in the operator network.

The foregoing describes in detail the method embodiments of the embodiments of this application with reference to FIG. 1 to FIG. 12. The following describes in detail apparatus embodiments of the embodiments of this application with reference to FIG. 13 to FIG. 18. It should be understood that, descriptions of the method embodiments correspond to descriptions of the apparatus embodiments. Therefore, for a part not described in detail, refer to the foregoing method embodiments.

Figure 13:
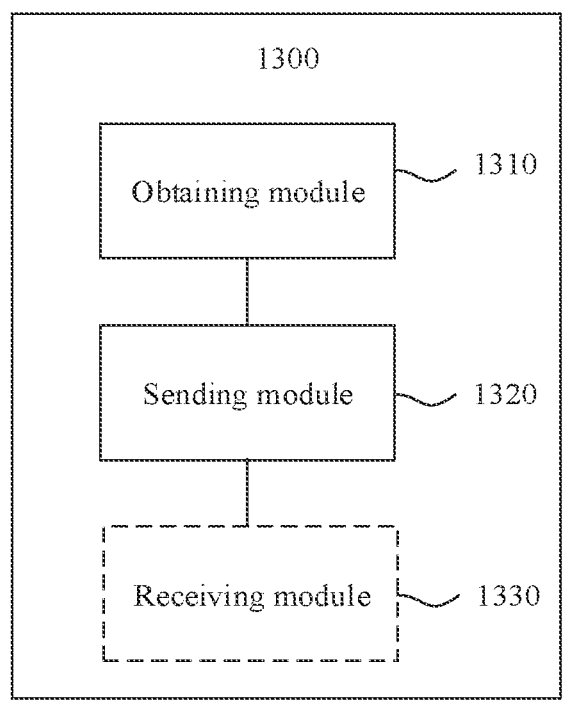
FIG. 13 is a schematic diagram of a structure of an apparatus according to an embodiment of this application.

FIG. 13 is a schematic diagram of a structure of an apparatus according to an embodiment of this application. The apparatus 1300 in FIG. 13 may be the foregoing core network function entity, for example, may be a specific example of the AMF network function entity 137 or the LIM network function entity 134 in FIG. 1. The apparatus shown in FIG. 13 may be configured to perform the methods in FIG. 3 to FIG. 12. To avoid redundancy, details are not described again.

The apparatus 1300 shown in FIG. 13 may include an obtaining module 1310 and a sending module 1320.

The obtaining module 1310 is configured to obtain an identity of a first terminal device, where the identity of the first terminal device is an identity in a first network.

The sending module 1320 is configured to send the identity of the first terminal device to an authentication device that is in a second network, where the identity of the first terminal device is used to determine an identity used by the second network to perform secondary authentication on a first user, and the identity of the first user is different from the identity of the first terminal device.

Optionally, the sending module 1320 is specifically configured to send a secondary authentication request to the authentication device that is in the second network, where the secondary authentication request includes the identity of the first terminal device but does not include the identity of the first user.

Optionally, the apparatus 1300 may further include a receiving module 1330, configured to receive a secondary authentication response message sent by the authentication device that is in the second network, where the secondary authentication response message is used to indicate the first terminal device and the second network to perform the secondary authentication on the first user.

Optionally, the sending module 1320 is configured to send a first message to the first terminal device, where the first message is used to request the identity of the first user.

Optionally, the receiving module 1330 is configured to receive a second message sent by the first terminal device. When the second message does not include the identity of the first user, the receiving module 1330 is configured to perform the secondary authentication on the first user based on the identity of the first terminal device.

Optionally, before performing the secondary authentication on the first user, the obtaining module 1310 is configured to obtain capability information of the first terminal device, where the capability information of the first terminal device is used to indicate that the core network function entity can perform the secondary authentication on the first user based on the identity of the first terminal device.

Optionally, the capability information of the first terminal device is carried in a registration request message that is in a process of primary authentication performed by the first terminal device and the first network.

Optionally, the identity of the first terminal device corresponds to identities used by the second network to perform the secondary authentication on a plurality of users, and the identities of the plurality of users include the identity of the first user. The obtaining module 1310 is configured to obtain a first indication, where the first indication is used to determine the identity of the first user in the identities of the plurality of users.

Optionally, the apparatus 1300 may further include a selection module. The selection module is configured to select a first authentication method used for the secondary authentication, where: the first authentication method is an authentication method supported by both the first terminal device and the authentication device that is in the second network.

Optionally, the selection module is specifically configured to obtain a first authentication method set and a second authentication method set, where the first authentication method set includes an authentication method preferred by the first terminal device, and the second authentication method set includes an authentication method preferred by the authentication device that is in the second network. The selection module is specifically configured to determine the first authentication method based on the first authentication method set and the second authentication method set, where the first authentication method is an authentication method preferred by both the first terminal device and the authentication device that is in the second network. The sending module 1320 is specifically configured to send the first authentication method to the authentication device that is in the second network.

Optionally, the second authentication method set is stored in the core network function entity, and/or the first authentication method set is stored in the first terminal device and/or the core network function entity.

Optionally, the obtaining module 1310 is configured to obtain a first authentication method set and a second authentication method set, where the first authentication method set includes an authentication method preferred by the first terminal device, and the second authentication method set includes an authentication method preferred by the authentication device that is in the second network; and when there is no intersection set of the first authentication method set and the second authentication method set, the sending module 1320 is configured to send the first authentication method set or a second indication to the authentication device that is in the second network, where the second indication is used to indicate the authentication device that is in the second network to negotiate an authentication method with the first terminal device.

Figure 14:
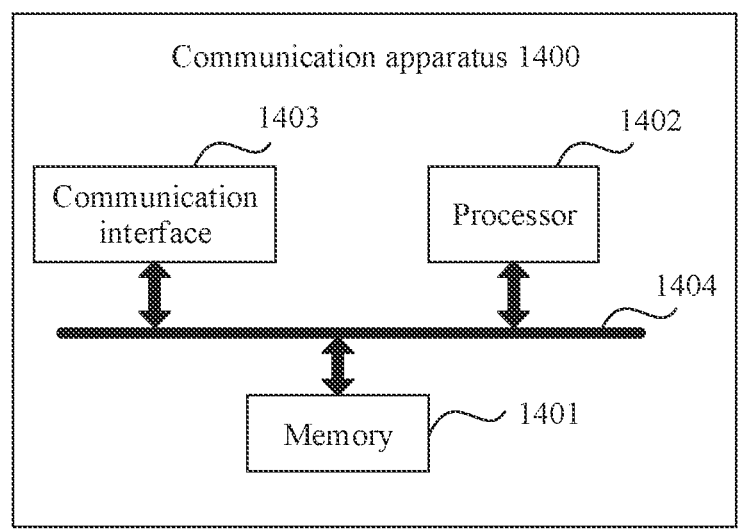
FIG. 14 is a schematic diagram of a structure of a communication apparatus according to an embodiment of this application.

FIG. 14 is a schematic diagram of a structure of a communication apparatus according to an embodiment of this application. The communication apparatus 1400 shown in FIG. 14 may correspond to the foregoing core network function entity. The communication apparatus 1400 includes a processor 1402. In this embodiment of this application, the processor 1402 is configured to control and manage an action of the core network function entity. For example, the processor 1402 is configured to support the core network function entity in performing the methods, operations, or functions shown in FIG. 3 to FIG. 11A and FIG. 11B in the foregoing embodiments. Optionally, the core network function entity may further include a memory 1401 and a communication interface 1403, The processor 1402, the communication interface 1403, and the memory 1401 may be connected to each other or connected to each other through a bus 1404, The communication interface 1403 is configured to support the core network function entity in performing communication, and the memory 1401 is configured to store program code and data of a network device. The processor 1402 invokes the code stored in the memory 1401 to perform control management. The memory 1401 may be coupled to or not coupled to the processor.

The processor 1402 may be a central processing unit, a general-purpose processor, a digital signal processor, an application-specific integrated circuit, a field programmable gate array or another programmable logic device, a transistor logical device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. The communication interface 1403 may be a transceiver, a circuit, a bus, a module, or another type of communication interface. The bus 1404 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 14, but this does not mean that there is only one bus or only one type of bus.

Figure 15:
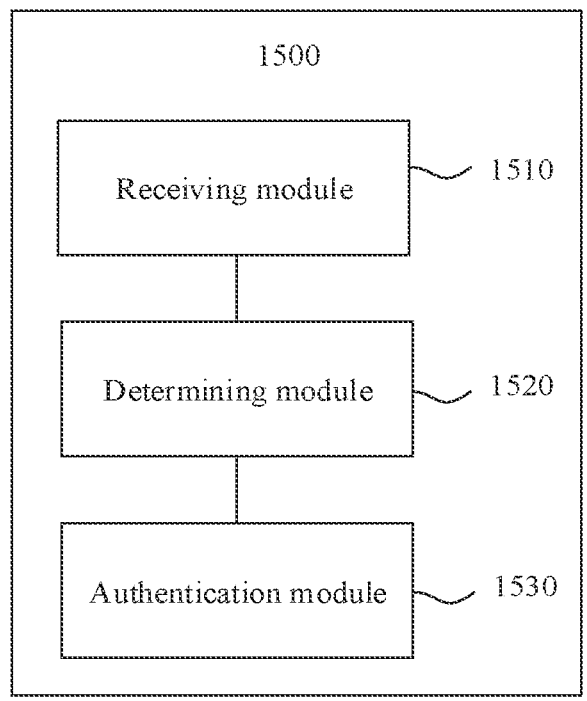
FIG. 15 is a schematic diagram of a structure of an apparatus according to another embodiment of this application.

FIG. 15 is a schematic diagram of a structure of an apparatus according to an embodiment of this application. The apparatus 1500 in FIG. 15 may be the foregoing authentication device that is in the second network, for example, may be a specific example of the AAA server 221 in FIG. 2. The apparatus shown in FIG. 15 may be configured to perform the methods in FIG. 3 to FIG. 12. To avoid redundancy, details are not described again.

The apparatus 1500 shown in FIG. 15 may include a receiving module 1510, determining module 1520, and an authentication module 1530.

The receiving module 1510 is configured to receive an identity of a first terminal device sent by a core network function entity, where the identity of the first terminal device is an identity in a first network.

The determining module 1520 is configured to determine an identity of a first user based on the identity of the first terminal device and a mapping relationship between the identity of the first terminal device and the identity used by a second network to perform secondary authentication on the first user, where the identity of the first user is different from the identity of the first terminal device.

The authentication module 1530 is configured to perform the secondary authentication on the first user based on the identity of the first user.

Optionally, the receiving module 1510 is specifically configured to receive a secondary authentication request sent by the core network function entity, where the secondary authentication request includes the identity of the first terminal device but does not include the identity of the first user.

The authentication module 1530 is specifically configured to send a secondary authentication response message to the core network function entity, where the secondary authentication response message is used to indicate the first terminal device and the second network to perform the secondary authentication on the first user.

Optionally, the identity of the first terminal device corresponds to identities used by the second network to perform the secondary authentication on a plurality of users, and the identities of the plurality of users include the identity of the first user. The receiving module 1510 is configured to receive a first indication sent by the core network function entity, where the first indication is used to determine the identity of the first user in the identities of the plurality of users.

Optionally, the receiving module 1510 is configured to receive a first authentication method sent by the core network function entity, where the first authentication method is an authentication method supported by both the first terminal device and an authentication device that is in the second network.

Optionally, the authentication module 1530 is configured to perform the secondary authentication on the first user according to the first authentication method.

Optionally, the receiving module 1510 is configured to receive a first authentication method set sent by the core network function entity, where the first authentication method set includes an authentication method preferred by the first terminal device.

Optionally, the receiving module 1510 is configured to select a second authentication method from the first authentication method set, where the second authentication method is an authentication method supported by an authentication device that is in the second network.

Optionally, the authentication module 1530 is configured to perform secondary authentication on the first user according to the second authentication method.

Optionally, the receiving module 1510 is configured to receive a second indication sent by the core network function entity, where the second indication is used to indicate an authentication device that is in the second network to negotiate an authentication method with the first terminal device.

Figure 16:
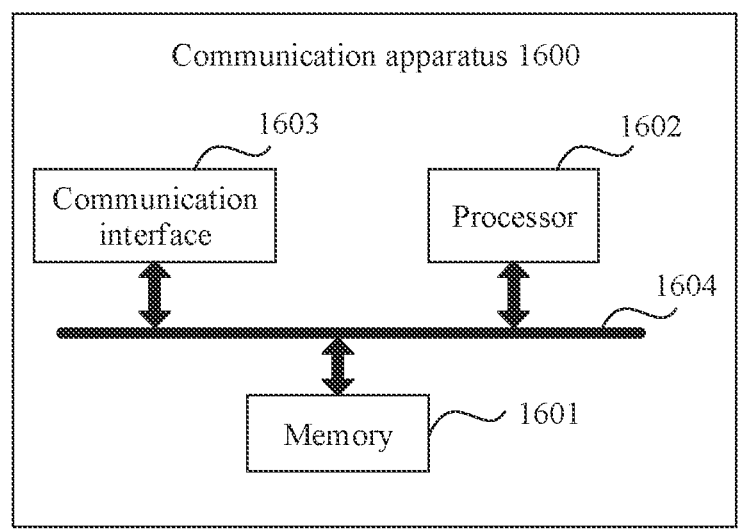
FIG. 16 is a schematic diagram of a structure of a communication apparatus according to another embodiment of this application.

FIG. 16 is a schematic diagram of a structure of a communication apparatus according to an embodiment of this application. The communication apparatus 1600 shown in FIG. 16 may correspond to the foregoing authentication device that is in the second network. The communication apparatus 1600 includes a processor 1602. In this embodiment of this application, the processor 1602 is configured to control and manage an action of the authentication device that is in the second network. For example, the processor 1602 is configured to support the authentication device that is in the second network in performing the methods, operations, or functions shown in FIG. 3 to FIG. 11A and FIG. 11B in the foregoing embodiments. Optionally, the authentication device in the second network may further include a memory 1601 and a communication interface 1603. The processor 1602, the communication interface 1603, and the memory 1601 may be connected to each other or connected to each other through a bus 1604. The communication interface 1603 is configured to support the authentication device that is in the second network in performing communication, and the memory 1601 is configured to store program code and data of a network device. The processor 1602 invokes the code stored in the memory 1601 to perform control management. The memory 1601 may be coupled to or not coupled to the processor.

The processor 1602 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. The communication interface 1603 may be a transceiver, a circuit, a bus, a module, or another type of communication interface. The bus 1604 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 16, but this does not mean that there is only one bus or only one type of bus.

Figure 17:
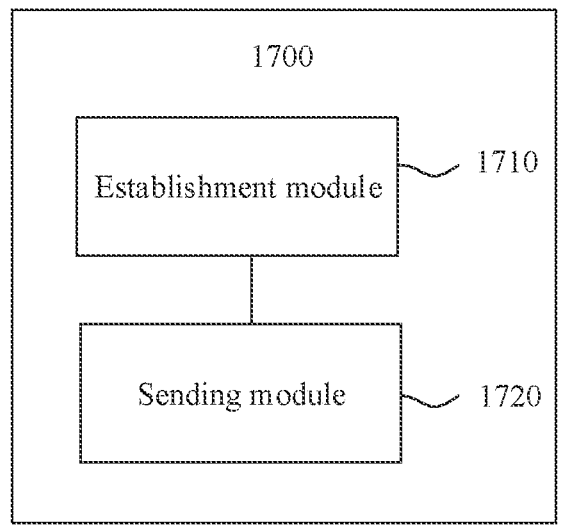
FIG. 17 is a schematic diagram of a structure of an apparatus according to still another embodiment of this application.

FIG. 17 is a schematic diagram of a structure of an apparatus according to an embodiment of this application. The apparatus 1700 in FIG. 17 may be the foregoing first terminal device, for example, may be a specific example of the terminal device 110 in FIG. 1 or the UE 210 in FIG. 2. The apparatus shown in FIG. 17 may be configured to perform the methods in FIG. 3 to FIG. 12. To avoid redundancy, details are not described again.

The apparatus 1700 shown in FIG. 17 may include an establishment module 1710 and a sending module 1720.

The establishment module 1710 is configured to establish a mapping relationship between an identity of a first terminal device and an identity used by a second network to perform secondary authentication on a first user, where the identity of the first terminal device is an identity in a first network.

The sending module 1720 is configured to send the identity of the first terminal device to a core network function entity, or send the identity of the first terminal device and a first indication to a core network function entity, where the first indication is used to determine the identity of the first user in identities used by the second network to perform the secondary authentication on a plurality of users.

Optionally, before performing the secondary authentication on the first user, the sending module 1720 is configured to send capability information of the first terminal device to the core network function entity, where the capability information of the first terminal device is used to indicate that the core network function entity can perform the secondary authentication on the first user based on the identity of the first terminal device.

Optionally, the sending module 1720 is configured to send a first authentication method set to the core network function entity, where the first authentication method set includes an authentication method preferred by the first terminal device.

Figure 18:
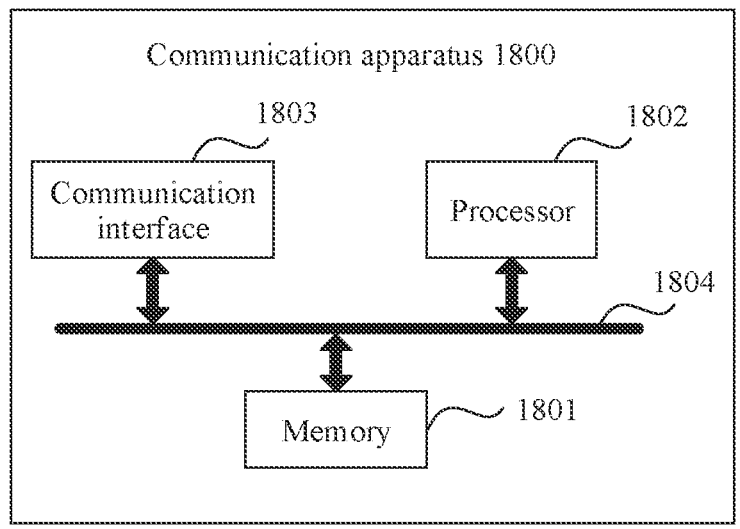
FIG. 18 is a schematic diagram of a structure of a communication apparatus according to still another embodiment of this application.

FIG. 18 is a schematic diagram of a structure of a communication apparatus according to an embodiment of this application. The communication apparatus 1800 shown in FIG. 18 may correspond to the foregoing first terminal device. The communication apparatus 1800 includes a processor 1802. In this embodiment of this application, the processor 1802 is configured to control and manage an action of the first terminal device. For example, the processor 1802 is configured to support the first terminal device in performing the methods, operations, or functions shown in FIG. 3 to FIG. 11A and FIG. 11B in the foregoing embodiments. Optionally, the first terminal device may further include a memory 1801 and a communication interface 1803. The processor 1802, the communication interface 1803, and the memory 1801 may be connected to each other or connected to each other through a bus 1804. The communication interface 1803 is configured to support the first terminal device in performing communication, and the memory 1801 is configured to store program code and data of a network device. The processor 1802 invokes the code stored in the memory 1801 to perform control management. The memory 1801 may be coupled to or not coupled to the processor.

The processor 1802 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. The communication interface 1803 may be a transceiver, a circuit, a bus, a module, or another type of communication interface. The bus 1804 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 18, but this does not mean that there is only one bus or only one type of bus.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the method described in the embodiments of this application. The storage medium includes any medium that can store program code such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A secondary authentication method, comprising:
obtaining, by a core network function entity, an identity of a first terminal device, wherein the identity of the first terminal device has an association with a second identity of the first terminal device, and the second identity is used in a first network to perform primary authentication for the first terminal device;
sending, by the core network function entity, the identity of the first terminal device to an authentication device in a second network, wherein the identity of the first terminal device is used to determine an identity of a first user using the first terminal device, wherein the identity of the first user is used by the second network to perform secondary authentication on the first user, wherein the identity of the first user is different from the identity of the first terminal device, and wherein sending, by the core network function entity, the identity of the first terminal device to the authentication device in the second network comprises:
sending, by the core network function entity, a secondary authentication request to the authentication device in the second network, wherein the secondary authentication request comprises the identity of the first terminal device but does not comprise the identity of the first user; and
receiving, by the core network function entity, a secondary authentication response message from the authentication device in the second network, wherein the secondary authentication response message is used to indicate the first terminal device and the second network to perform the secondary authentication on the first user.

2. The method according to claim 1, further comprising:
sending, by the core network function entity, a first message to the first terminal device, wherein the first message is used to request the identity of the first user;
receiving, by the core network function entity, a second message from the first terminal device; and
when the second message does not comprise the identity of the first user, performing, by the core network function entity, the secondary authentication on the first user based on the identity of the first terminal device.

3. The method according to claim 1, further comprising:
before performing the secondary authentication on the first user, obtaining, by the core network function entity, capability information of the first terminal device, wherein the capability information of the first terminal device is used to indicate that the core network function entity can perform the secondary authentication on the first user based on the identity of the first terminal device.

4. The method according to claim 3, wherein the capability information of the first terminal device is carried in a registration request message in a process of primary authentication performed by the first terminal device and the first network.

5. The method according to claim 1, wherein the identity of the first terminal device corresponds to identities used by the second network to perform the secondary authentication on a plurality of users, wherein the identities of the plurality of users comprise the identity of the first user, and wherein the method further comprises:
obtaining, by the core network function entity, a first indication, wherein the first indication is used to determine the identity of the first user in the identities of the plurality of users.

6. The method according to claim 1, further comprising:
selecting, by the core network function entity, a first authentication method used for the secondary authentication, wherein the first authentication method is an authentication method supported by both the first terminal device and the authentication device in the second network.

7. The method according to claim 6, wherein the selecting, by the core network function entity, a first authentication method used for the secondary authentication comprises:
obtaining, by the core network function entity, a first authentication method set and a second authentication method set, wherein the first authentication method set comprises an authentication method preferred by the first terminal device, and wherein the second authentication method set comprises an authentication method preferred by the authentication device in the second network;
determining, by the core network function entity, the first authentication method based on the first authentication method set and the second authentication method set, wherein the first authentication method is an authentication method preferred by both the first terminal device and the authentication device in the second network; and
sending, by the core network function entity, the first authentication method to the authentication device in the second network.

8. The method according to claim 1, further comprising:
obtaining, by the core network function entity, a first authentication method set and a second authentication method set, wherein the first authentication method set comprises an authentication method preferred by the first terminal device, and wherein the second authentication method set comprises an authentication method preferred by the authentication device in the second network; and
when there is no intersection set of the first authentication method set and the second authentication method set, sending, by the core network function entity, the first authentication method set or a second indication to the authentication device in the second network, wherein the second indication is used to indicate the authentication device in the second network to negotiate an authentication method with the first terminal device.

9. The method according to claim 1, wherein the identity of the first terminal device includes a generic public subscription identifier (GPSI), and the second identity of the first terminal device includes a subscriber permanent identifier (SUPI).

10. The method according to claim 1, wherein the second network includes a third-party network.

11. A secondary authentication method, comprising:
receiving an identity of a first terminal device from a core network function entity, wherein the identity of the first terminal device has an association with a second identity of the first terminal device, and the second identity is used in a first network to perform primary authentication for the first terminal device;
determining an identity of a first user using the first terminal device based on the identity of the first terminal device and a mapping relationship between the identity of the first terminal device and the identity used by a second network to perform secondary authentication on the first user, wherein the identity of the first user is different from the identity of the first terminal device; and
performing the secondary authentication on the first user based on the identity of the first user;
wherein the receiving an identity of a first terminal device from a core network function entity comprises:
receiving a secondary authentication request from the core network function entity, wherein the secondary authentication request comprises the identity of the first terminal device but does not comprise the identity of the first user; and
wherein the performing the secondary authentication on the first user based on the identity of the first user comprises:
sending a secondary authentication response message to the core network function entity, wherein the secondary authentication response message is used to indicate the first terminal device and the second network to perform the secondary authentication on the first user.

12. The method according to claim 11, wherein the identity of the first terminal device corresponds to identities used by the second network to perform the secondary authentication on a plurality of users, wherein the identities of the plurality of users comprise the identity of the first user, and wherein the method further comprises:
receiving a first indication from the core network function entity, wherein the first indication is used to determine the identity of the first user in the identities of the plurality of users.

13. The method according to claim 11, further comprising:
receiving a first authentication method from the core network function entity, wherein the first authentication method is an authentication method supported by both the first terminal device and an authentication device in the second network; and
performing the secondary authentication on the first user according to the first authentication method.

14. The method according to claim 11, further comprising:
receiving a first authentication method set from the core network function entity, wherein the first authentication method set comprises an authentication method preferred by the first terminal device;
selecting a second authentication method from the first authentication method set, wherein the second authentication method is an authentication method supported by an authentication device in the second network; and
performing the secondary authentication on the first user according to the second authentication method.

15. The method according to claim 11, further comprising:
receiving a second indication from the core network function entity, wherein the second indication is used to indicate an authentication device in the second network to negotiate an authentication method with the first terminal device.

16. The method according to claim 11, wherein the identity of the first terminal device includes a generic public subscription identifier (GPSI), and the second identity of the first terminal device includes a subscriber permanent identifier (SUPI).

17. The method according to claim 11, wherein the second network includes a third-party network.

18. A secondary authentication method, comprising:
establishing a mapping relationship between an identity of a first terminal device and an identity of a first user using the first terminal device, wherein the identity of the first user is used by a second network to perform secondary authentication on the first user, wherein the identity of the first terminal device has an association with a second identity of the first terminal device, and the second identity is used in a first network to perform primary authentication for the first terminal device;

sending the identity of the first terminal device to a core network function entity, or sending the identity of the first terminal device and a first indication to a core network function entity, wherein the first indication is used to determine the identity of the first user in identities used by the second network to perform secondary authentication on a plurality of users; and before performing the secondary authentication on the first user, sending capability information of the first terminal device to the core network function entity, wherein the capability information of the first terminal device is used to indicate that the core network function entity can perform the secondary authentication on the first user based on the identity of the first terminal device.

19. The method according to claim 18, further comprising:

sending a first authentication method set to the core network function entity, wherein the first authentication method set comprises an authentication method preferred by the first terminal device.

20. The method according to claim 18, wherein the identity of the first terminal device includes a generic public subscription identifier (GPSI), and the second identity of the first terminal device includes a subscriber permanent identifier (SUPI).

* * * * *